(12) United States Patent
Saika

(10) Patent No.: US 10,634,582 B2
(45) Date of Patent: Apr. 28, 2020

(54) LENS CHARACTERISTIC EVALUATION DEVICE AND METHOD OF OPERATING LENS CHARACTERISTIC EVALUATION DEVICE

(71) Applicant: TOPCON CORPORATION, Tokyo (JP)

(72) Inventor: Makoto Saika, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 16/139,101

(22) Filed: Sep. 24, 2018

(65) Prior Publication Data

US 2019/0094106 A1  Mar. 28, 2019

(30) Foreign Application Priority Data

Sep. 26, 2017  (JP) ................................ 2017-185272
Jul. 18, 2018  (JP) ................................ 2018-135146

(51) Int. Cl.
*G01M 11/02* (2006.01)
*G02B 26/10* (2006.01)

(52) U.S. Cl.
CPC ....... *G01M 11/0207* (2013.01); *G02B 26/101* (2013.01)

(58) Field of Classification Search
CPC ......... G01M 11/0207; G01M 11/0292; G01M 11/0228; G01M 11/0242; G01M 11/0285; G02B 27/0025; G02B 26/101
USPC .................................................. 356/124–127
See application file for complete search history.

(56) References Cited

U.S. PATENT DOCUMENTS

| | | | | | |
|---|---|---|---|---|---|
| 6,480,267 | B2* | 11/2002 | Yanagi | ...................... | G01J 9/00 |
| | | | | | 356/121 |
| 7,075,633 | B2* | 7/2006 | Wegmann | .......... | G01M 11/0285 |
| | | | | | 250/201.9 |
| 7,307,706 | B2* | 12/2007 | Veitch | ...................... | G01J 9/00 |
| | | | | | 356/124 |
| 2012/0293808 | A1* | 11/2012 | Parks | ................... | G01M 11/005 |
| | | | | | 356/610 |
| 2018/0058978 | A1* | 3/2018 | Nakata | ............... | G01M 11/0207 |

FOREIGN PATENT DOCUMENTS

JP  2005274473 A  10/2005
JP  2006275971 A  10/2006

* cited by examiner

*Primary Examiner* — Hoa Q Pham
(74) *Attorney, Agent, or Firm* — Xsensus LLP

(57) ABSTRACT

A lens characteristic evaluation device includes: a scanning optical system configured to scan a surface of a test lens with a linear luminous flux; a Hartmann plate provided on a side opposite to the scanning optical system with respect to the test lens and having a plurality of two-dimensionally arranged pinholes, the Hartmann plate being configured to transmit the linear luminous flux which has passed through the test lens and radiated on the pinholes by the scanning performed by the scanning optical system; a screen on which the linear luminous flux having passed through the Hartmann plate is projected; and a photographing optical system provided on a side opposite to the Hartmann plate with respect to the screen and configured to photograph the screen while the scanning with the linear luminous flux is being performed by the scanning optical system.

12 Claims, 21 Drawing Sheets

FIG.7
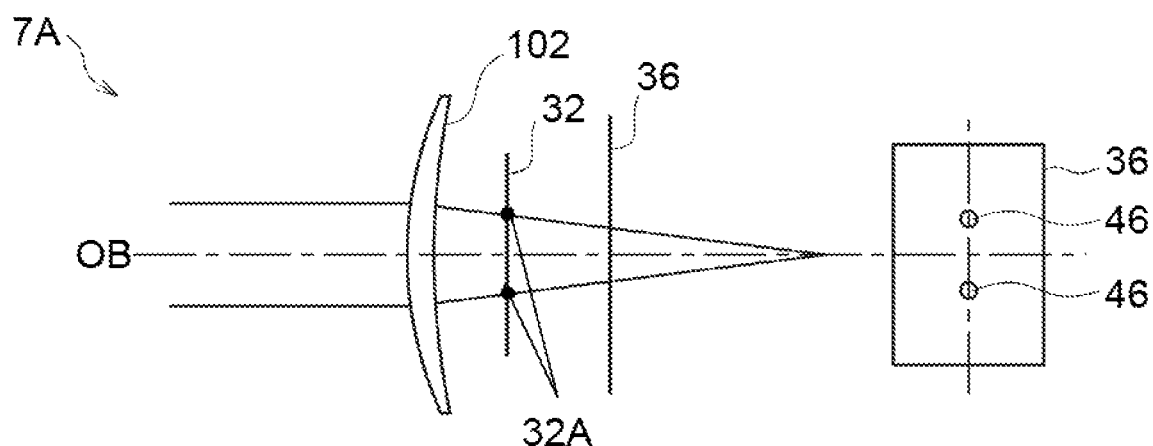
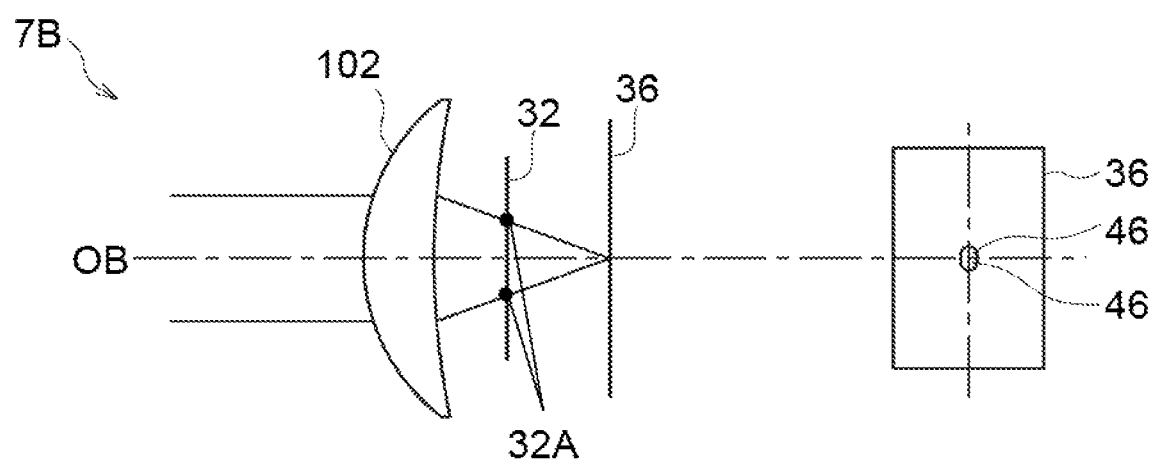
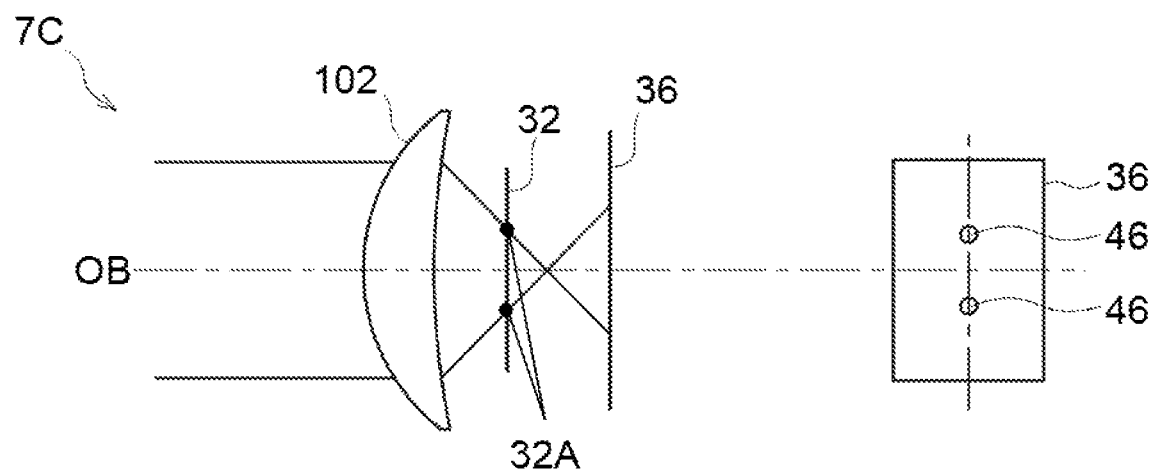

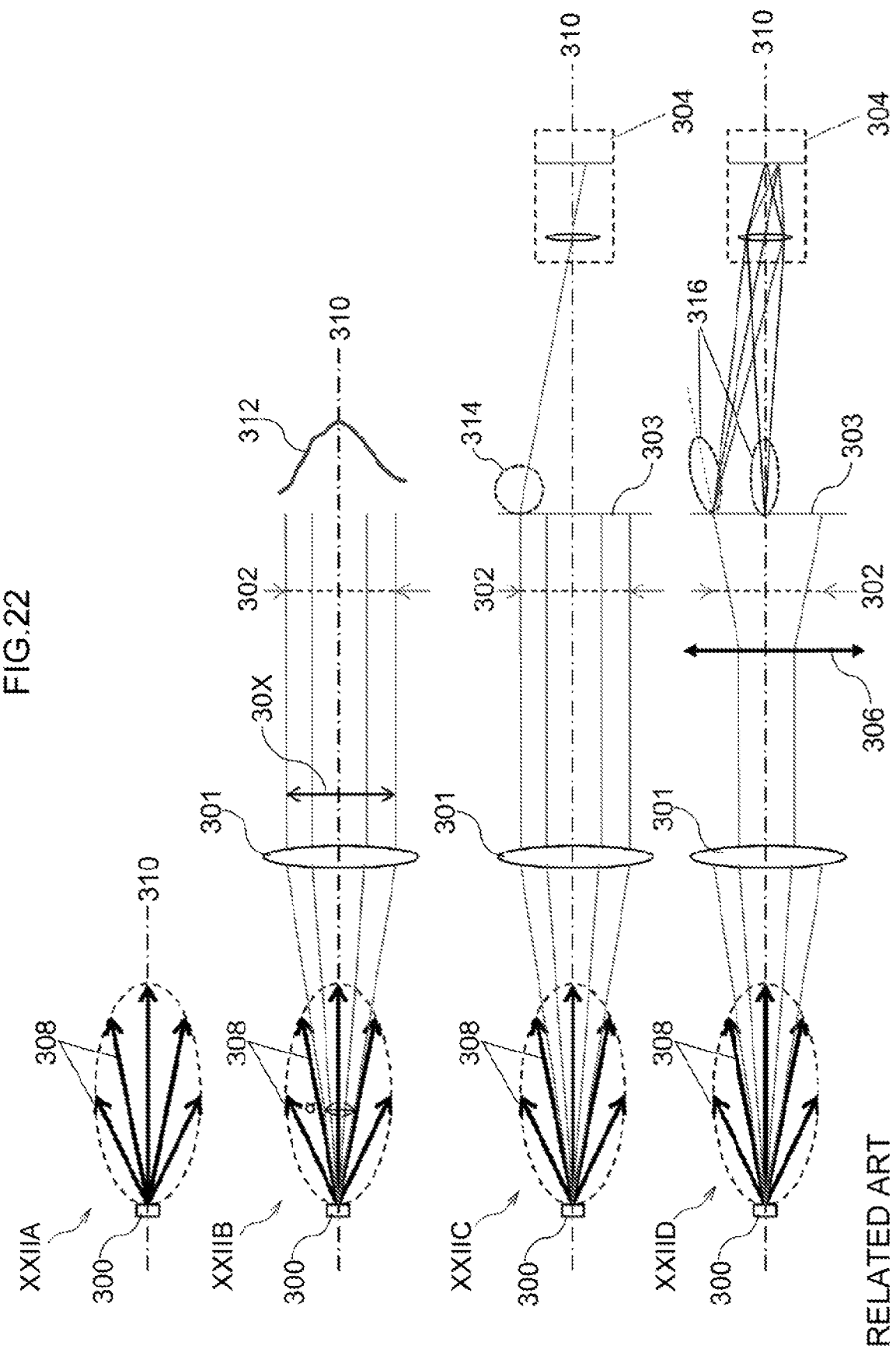

LENS CHARACTERISTIC EVALUATION DEVICE AND METHOD OF OPERATING LENS CHARACTERISTIC EVALUATION DEVICE

CROSS-REFERENCE TO RELATED APPLICATION

The present application claims priorities under 35 U.S.C. § 119 to Japanese Patent Application No. 2017-185272, filed on Sep. 26, 2017 and Japanese Patent Application No. 2018-135146, filed on Jul. 18, 2018. Each of the above applications is hereby expressly incorporated by reference, in its entirety, into the present application.

BACKGROUND OF THE INVENTION

Field of the Invention

The present invention relates to a lens characteristic evaluation device that evaluates optical characteristics of a test lens (lens to be tested) and a method of operating the lens characteristic evaluation device.

Description of the Related Art

A lens characteristic evaluation device is brown that evaluates an optical characteristic of a spectacle lens (test lens). The lens characteristic evaluation device includes: an illumination optical system which irradiates the test lens with a measuring light consisting of parallel luminous flux having a light flux diameter covering its measurement range; a Hartmann plate on which the measuring light having passed the test lens is incident; a screen on which the measuring lights respectively having passed through numerous pinholes of the Hartmann plate are projected; and a photographing optical system configured to capture numerous point images of the measuring light projected on the screen (see Japanese Patent Application Laid-Open No. 2005-274473 and Japanese Patent Application Laid-Open No. 2006-275971).

In the lens characteristic evaluation device, if the test lens is not set, the interval of the respective point images projected on the screen becomes equal to the interval between the respective pinholes of the Hartmann plate. Also, if the test lens is a convex lens, the interval between the respective point images projected on the screen becomes narrower than the interval between the respective pinholes of the Hartmann plate. Further, if the test lens is a concave lens, the interval between the respective point images projected on the screen becomes wider than the interval between the respective pinholes of the Hartmann plate. As a result, in the lens characteristic evaluation device, a captured image of the screen photographed by the photographing optical system is analyzed to acquire the positions of the respective point images projected on the screen and thereby an optical characteristic of the test lens is evaluated.

In such a lens characteristic evaluation device, when the refractive power of the test lens varies, the amount of movement of the point images on the screen becomes large in proportion to the length of the distance from the test lens to the screen and accordingly the sensitivity (resolution) of the lens characteristic evaluation device is improved. However, when the distance from the test lens to the screen is made longer, then, in a case where the optical characteristics of the test lens of a strong plus power (the focal length is short) is measured by the lens characteristic evaluation device, two pieces of point images on the screen each corresponding to one of the different two pinholes of the Hartmann plate may be overlapped with each other or their positional relationship may be inverted. As a result, the accurate positions of the respective point images cannot be detected.

In view of this, Japanese Patent Application Laid-Open No. 2005-274473 discloses a lens characteristic evaluation device that can change the distance between the Hartmann plate and the screen. In this lens characteristic evaluation device, when an optical characteristic of a test lens with a weak plus power or a test lens with a minus power is measured, the above-mentioned distance is made longer and, when an optical characteristic of a test lens with a strong plus power is measured, the above-mentioned distance is made shorter, and thereby the above-mentioned overlapping of the point images and the occurrence of the inversion of the positional relationship are prevented.

Also, Japanese Patent Application Laid-Open No. 2006-275971 discloses, although the positional relationship between the Hartmann plate and the test lens is inverted when compared with Japanese Patent Application Laid-Open No. 2005-274473, a lens characteristic evaluation device that can change the distance between the test lens and the screen. In this lens characteristic evaluation device, the distance between the test lens and the screen is changed to be two different distances, the respective point images projected on the screen are photographed by the photographing optical system at the respective individual distances, and the optical characteristic of the test lens is evaluated based on the captured images for the respective distances obtained by the photographing.

CITATION LIST

Patent Literature 1: Japanese Patent Application Laid-Open No. 2005-274473
Patent Literature 2: Japanese Patent Application Laid-Open No. 2006-275971

SUMMARY OF THE INVENTION

In the meantime, as in the lens characteristic evaluation devices disclosed in Japanese Patent Application Laid-Open No. 2005-274473 and Japanese Patent Application Laid-Open No. 2006-275971, when the screen is moved, a problem arises that the size of the lens characteristic evaluation device becomes large because a movement mechanism for moving the screen is provided. Also, when the screen is moved, it is susceptible to the influence of the reproducibility of the moving distance.

FIG. 22 is an explanatory diagram for explaining the problem that arises due to the light source (measuring light) of the lens characteristic evaluation device of Japanese Patent Application Laid-Open No. 2005-274473 and Japanese Patent Application Laid-Open No. 2006-275971. Note that, in FIG. 22, the optical characteristic of the test lens 306 (minus power) is evaluated in a lens characteristic evaluation device that includes a light source 300, a collimator 301, a Hartmann plate 302, a screen 303, and a camera 304.

In the lens characteristic evaluation devices described in Japanese Patent Application Laid-Open No. 2005-274473 and Japanese Patent Application Laid-Open No. 2006-275971, as already described, a measuring light 30X having a light flux diameter that covers the measurement range on the lens surface of the test lens 306 is necessary. Therefore, in the lens characteristic evaluation device, it is necessary to use a light source 300 of a type in which a light distribution angle of the measuring light 308 is wide. However, as a result, a luminous intensity of the light source 300 decreases due to widening of the light distribution angle.

As illustrated in a part indicated by the reference sign XXIIA in FIG. 22, in the light source 300, its luminous intensity of the measuring light 308 is the highest on the optical axis 310 and the luminous intensity of the measuring light 308 decreases as an angle α with respect to the optical axis 310 increases. As a result, as illustrated in a part indicated by the reference sign XXIIB of FIG. 22, when a parallel luminous flux with a large diameter of the measuring light 30X is created using the collimator 301, the light quantity distribution 312 of the measuring light 308 shows at the light quantity at the peripheral portion is lower than that on the optical axis 310. Accordingly, illuminance of the point image (bright point) passing though the pinhole of the Hartmann plate 302 and projected on the screen 303, is decreased at the peripheral portion when compared with the center portion of the screen 303.

Further, as illustrated in a part indicated by the reference sign XXIIC of FIG. 22, in the lens characteristic evaluation device, the screen 303 on which point images are projected is photographed (captured) by the camera 304, and the captured image by the camera 304 is analyzed to detect positions of the point images. As a result, the images in the peripheral portion in the captured image are darkened according to the cosine fourth law when compared with the image on the optical axis 310.

Further, since a typical screen 303 is not an ideal diffusion surface (see the dotted line circle 314), as illustrated in a part indicated by the reference sign XXIID of FIG. 22, the measuring light 308 with an angle of incident on the screen 303 has the highest light intensity, and the light intensity decrease in directions other than that (see the dotted line ellipse 316). In particular, if the test lens 306 is a lens with a minus power, the measuring light 308 that has passed the test lens 306 becomes a divergent light. As a result, the peripheral flux of the measuring light 308 that has transmitted the test lens 306 is oriented outward, so that the light intensity of the measuring light 308 that can be received by the camera 304 is lowered. As a result, the luminance of the point images photographed by the camera 304 will be lowered at the peripheral portion of the camera 304 when compared with that of the center portion of the camera 304.

Accordingly, in a conventional lens characteristic evaluation device, when the respective elements (the light source luminance, the gain of the camera 304, the accumulation time of the imaging element of the camera 304, and the like) are adjusted such that the brightness of the captured image at the center portion thereof becomes appropriate, the peripheral portion of the captured image is darkened. As a result of this, it becomes impossible to detect the point images in the peripheral portion. Also, conversely, when the adjustment is performed such that the brightness at the peripheral portion of the captured image becomes appropriate, whiteout (saturation) of the point images in the center portion of the captured image occurs. As a result, the accuracy of detection of the position of the point image is decreased.

An object of the present invention has been made in view of such circumstances, and aims to provide a lens characteristic evaluation device that can prevent degradation of the measurement sensitivity at the center portion and the peripheral portion of the captured image and prevent increase in device size, and a method of operating the lens characteristic evaluation device.

In order to achieve the object of the present invention, a lens characteristic evaluation device includes: a scanning optical system configured to scan a surface of a test lens with a linear luminous flux; a Hartmann plate provided on a side opposite to the scanning optical system with respect to the test lens and having a plurality of two-dimensionally arranged pinholes, the Hartmann plate being configured to transmit the linear luminous flux which has passed through the test lens and radiated on the pinholes by the scanning performed by the scanning optical system; a screen on which the linear luminous flux having passed through the Hartmann plate is projected; and a photographing optical system provided on a side opposite to the Hartmann plate with respect to the screen and configured to photograph the screen while the scanning with the linear luminous flux is being performed by the scanning optical system.

According to this lens characteristic evaluation device, by scanning the surface of the spectacle lens with the linear luminous flux, it is made possible to prevent occurrence of a brightness difference between the center portion and the peripheral portion in the captured image of the point images formed by the linear luminous flux, and prevent overlapping of point images formed by the linear luminous flux projected on the screen and inversion of the positional relationship of the point images, without providing a movement mechanism that moves the screen.

The lens characteristic evaluation device in accordance with another aspect of the present invention further includes: a position acquisition unit configured to analyze a captured image of the screen that is photographed by the photographing optical system and acquire a projection position of the linear luminous flux projected on the screen; a position determination unit configured to determine a pinhole position of the pinhole through which the linear luminous flux projected on the screen has passed; and an optical characteristic acquisition unit configured to acquire an optical characteristic of the test lens, based on the projection position acquired by the position acquisition unit, a determination result of the pinhole position by the position determination unit, and known positional relationship among the test lens, the Hartmann plate, and the screen. By virtue of this, it is made possible to evaluate with high accuracy the optical characteristic of the test lens regardless of the types of the test lens.

In the lens characteristic evaluation device in accordance with another aspect of the present invention, the position determination unit determines the pinhole position based on the projection position of the linear luminous flux acquired by the position acquisition unit and a scan angle of the linear luminous flux in the scanning by the scanning optical system, the scan angle being an angle of the linear luminous flux projected at the projection position. By virtue of this, it is made possible to exactly determine the positions of the pinholes through which the respective linear luminous fluxes projected on the screen have respectively passed.

The lens characteristic evaluation device in accordance with another aspect of the present invention further includes: a light splitting unit provided at a location on an optical path of the linear luminous flux extending from the scanning optical system to the surface of the test lens, and configured to split the linear luminous flux; a light-receiving optical system configured to receive the linear luminous flux split by the light splitting unit; and a measured value acquisition unit configured to acquire a measured value of the scan angle based on a light receiving position of the linear luminous flux received by the light-receiving optical system, wherein the position determination unit determines the pinhole position based on the projection position of the linear luminous flux and the measured value of the scan angle acquired by the measured value acquisition unit. By virtue of this, it is made possible to more exactly determine the positions of the pinholes through which the respective linear luminous fluxes projected on the screen have respectively passed.

The lens characteristic evaluation device in accordance with another aspect of the present invention further includes a mapping image generation unit configured to generate a mapping image indicating a distribution of the optical characteristic of the test lens, based on the optical characteristic of the test lens acquired by the optical characteristic acquisition unit and the measured value of the scan angle acquired by the measured value acquisition unit. By virtue of this, it is made possible to improve the reproducibility of the mapping image.

In the lens characteristic evaluation device in accordance with another aspect of the present invention, the pinholes are two-dimensionally arranged at regular intervals in the Hartmann plate, and the scanning optical system adjusts a diameter of the linear luminous flux so as to be larger than a diameter of the pinholes on the Hartmann plate and smaller than a distance between the pinholes adjacent to each other. By virtue of this, it is made possible to reliably carry out the position detection for the point images formed by the luminous flux projected on the screen, and prevent overlapping of the point images formed by the luminous flux projected on the screen and inversion of the positional relationship of the point images.

The lens characteristic evaluation device in accordance with another aspect of the present invention further includes a point image number adjustment unit configured to control the scanning optical system so as to adjust a number of point images which are formed by the linear luminous flux and included in the captured image of the screen photographed by the photographing optical system. By virtue of this, by increasing the number of point images formed by the linear luminous flux and included in the captured image of the screen, it is made possible to complete the evaluation of the optical characteristic in a short time. Conversely, by decreasing the number of point images formed by the linear luminous flux and included in the captured image of the screen, it is made possible to prevent overlapping of the point images formed by the linear luminous flux projected on the screen and occurrence of inversion of the positional relationship of the point images, and the like.

The lens characteristic evaluation device in accordance with another aspect of the present invention further includes a scan setting unit configured to perform setting of at least either one of a scanning range and a type of a scanning patter of the linear luminous flux, wherein the scanning optical system performs scanning with the linear luminous flux in accordance with the setting by the scan setting unit. By virtue of this, the scanning range and the scanning pattern of the linear luminous flux can be changed as appropriate according to the types of the spectacle lens.

The lens characteristic evaluation device in accordance with another aspect of the present invention further includes: an optical system control unit configured to control a scan angle of the linear luminous flux emitted from the scanning optical system so as to scan the surface of the test lens with the linear luminous flux; a light splitting unit provided at a location on an optical path of the linear luminous flux extending from the scanning optical system to the surface of the test lens, and configured to split the linear luminous flux; a light-receiving optical system configured to receive the linear luminous flux split by the light splitting unit; a measured value acquisition unit configured to acquire a measured value of the scan angle based on a light receiving position of the linear luminous flux received by the light-receiving optical system; and a correction unit configured to correct control of the scan angle by the optical system control unit based on a result of comparison between an instruction value of the scan angle acquired in advance and the measured value acquired by the measured value acquisition unit. By virtue of this, it is possible to improve the evaluation accuracy of the optical characteristic of the test lens and the reproducibility of the mapping image of the optical characteristics.

In order to achieve the object of the present invention, a method of operating a lens characteristic evaluation device including, a Hartmann plate provided on one surface side of a test lens and having a plurality of two-dimensionally arranged pinholes, a screen provided on a side opposite to the test lens with respect to the Hartmann plate, and a photographing optical system provided on a side opposite to the Hartmann plate with respect to the screen and configured to perform photographing of the screen, the method includes: a step of scanning a surface of the test lens with a linear luminous flux by a scanning optical system arranged on another surface side opposite to the one surface side of the test lens; and a step of photographing, by the photographing optical system, the screen on which the linear luminous flux having passed through the test lens and the pinhole is projected while the scanning with the linear luminous flux is being performed by the scanning optical system.

The method of operating the lens characteristic evaluation device in accordance with still another aspect of the present invention further includes: a position acquisition step of analyzing a captured image of the screen photographed by the photographing optical system and acquiring a projection position of the linear luminous flux projected on the screen; a position determination step of determining a pinhole position of the pinhole through which the linear luminous flux projected on the screen has passed; and an optical characteristic acquisition step of acquiring an optical characteristic of the test lens based on the projection position acquired in the position acquisition step, a determination result of the pinhole position in the position determination step, and known positional relationships among the test lens, the Hartmann plate, and the screen, wherein the position determination step determines the pinhole position based on the projection position of the linear luminous flux acquired in the position acquisition step and a scan angle of the linear luminous flux in the scanning by the scanning optical system, the scan angle being an angle of the linear luminous flux projected at the projection position, the position determination step includes a light splitting step of splitting linear luminous flux at a location on an optical path of the linear luminous flux extending from the scanning optical system to the surface of the test lens, a light receiving step of receiving the linear luminous flux split in the light splitting step by a light-receiving optical system, and a measured value acquisition step of acquiring a measured value of the scan angle based on a light receiving position of the linear luminous flux received by the light-receiving optical system, and the position determination step determines the pinhole position based on the projection position of the linear luminous flux and the measured value of the scan angle acquired in the measured value acquisition step.

In the method of operating the lens characteristic evaluation device in accordance with yet another aspect of the present invention, the lens characteristic evaluation device further includes an optical system control unit configured to control a scan angle of the linear luminous flux emitted from the scanning optical system so as to scan the surface of the test lens with the linear luminous flux, and the method further includes: a light splitting step of splitting the linear luminous flux at a location on an optical path of the linear luminous flux extending from the scanning optical system to the surface of the test lens; a light receiving step of receiving the linear luminous flux split in the light splitting step; a measured value acquisition step of acquiring a measured value of the scan angle based on a light receiving position of the linear luminous flux received in the light receiving step; and a correction step of correcting control of the scan angle by the optical system control unit based on a result of comparison between an instruction value of the scan angle acquired in advance and the measured value acquired in the measured value acquisition step.

The present invention can prevent degradation of the evaluation sensitivity at the center portion and the peripheral portion of the captured image, and prevent increase in device size.

BRIEF DESCRIPTION OF THE DRAWINGS

FIG. 7 is an explanatory diagram for explaining the reason why an upper limit is set for a diameter of a linear luminous flux is set;

FIG. 22 is an explanatory diagram for explaining problems arising due to a light source (measuring light) of the lens characteristic evaluation device of Japanese Patent Application Laid-Open No. 2005-274473 and Japanese Patent Application Laid-Open No. 2006-275971.

DETAILED DESCRIPTION OF THE PREFERRED EMBODIMENTS

<Configuration of the Lens Characteristic Evaluation device according to the First Embodiment>

Figure 1:
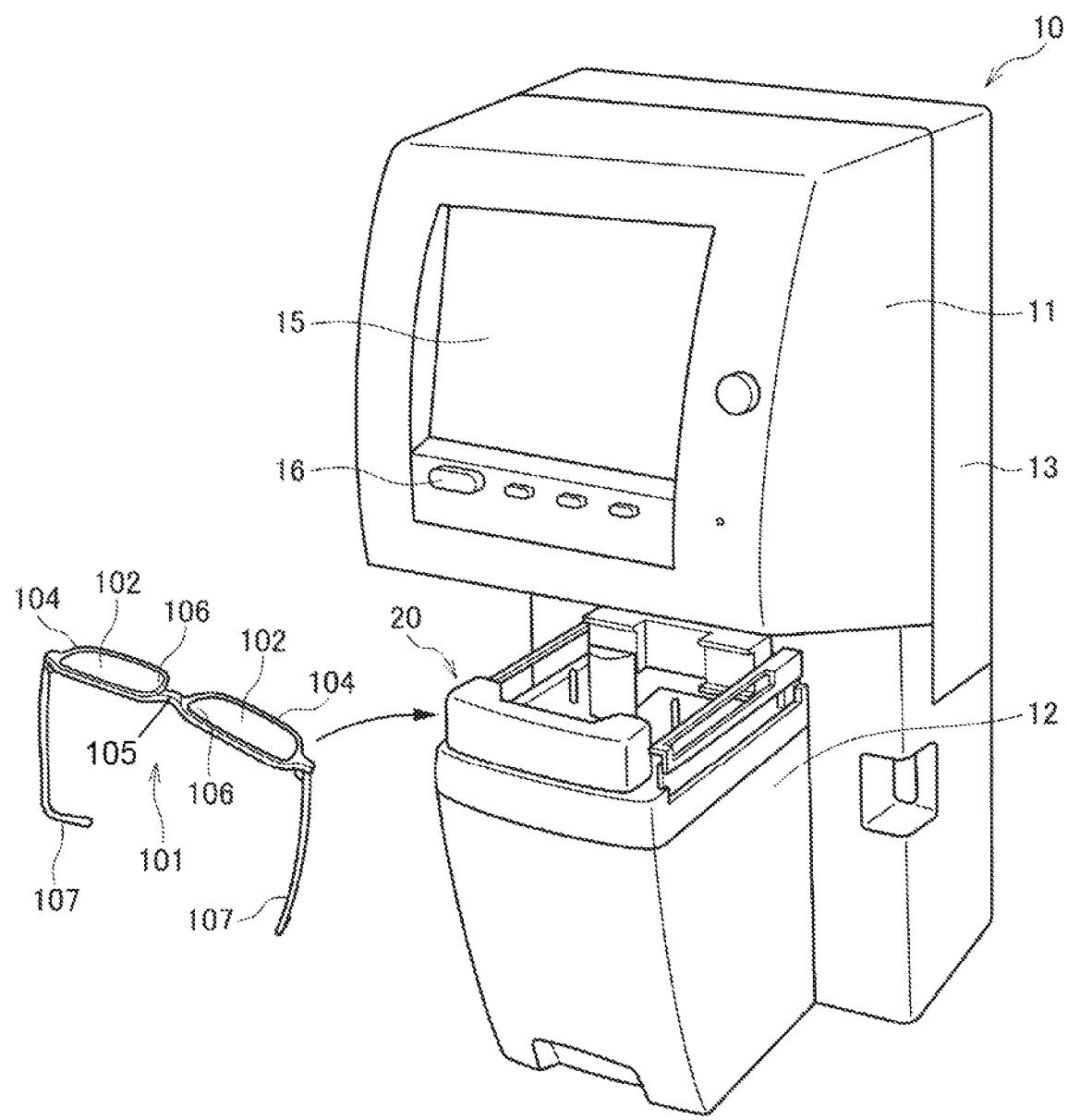
FIG. 1 is an external perspective view of a lens characteristic evaluation device according to a first embodiment.

FIG. 1 is an external perspective view of a lens characteristic evaluation device 10 according to a first embodiment. The lens characteristic evaluation device 10 is configured to simultaneously evaluate optical characteristics of left and right spectacle lenses 102 (which correspond to the "test lens" according to the present invention) held by a spectacle frame 101. The optical characteristic is, for example, a back focus Bf (see FIG. 9), spherical refractive power, cylindrical refractive power (astigmatic refractive power), cylindrical axis angle (astigmatic axis angle), a prism value (prism refractive power and prism base direction), and the like.

The spectacle frame 101 includes: left and right rims 104 (which may also be referred to as "lens frame") that respectively hold the left and night spectacle lenses 102; a bridge section 105 connecting the left and right rims 104 to each other; and a nose pad section 106 and a temple 107 provided in each of the left and right rims 104.

The lens characteristic evaluation device 10 includes: an upper housing 11 and lower housing 12 provided such that they are spaced from each other in an up-and-down direction in the figure; and a back section housing 13 provided on the rear side of the upper housing 11 and the lower housing 12.

On the front side of the upper housing 11, the lens characteristic evaluation device 10 includes a monitor 15 adapted to display evaluation results of the optical characteristic of the spectacle lens 102 and the like and various operation switches 16 for various operations on the lens characteristic evaluation device 10. Also, inside the upper housing 11, a pair of scanning optical systems 35 (see FIG. 4) are provided which are configured to irradiate each of the left and right spectacle lenses 102 of the spectacle frame 101 supported by a setting unit 20, which will be described later, with a linear luminous flux 46 (see FIG. 4) which is a measuring light. Note that a part of the pair of scanning optical systems 35 is provided inside the back section housing 13.

On the upper surface of the lower housing 12, the setting unit 20 is provided at a lower position relative to the upper housing 11 (a radiation position of the linear luminous flux 46 from the upper housing 11 (see FIG. 4)). The spectacle frame 101 whose optical characteristic is to be evaluated is set on and supported by the setting unit 20.

Figure 4:
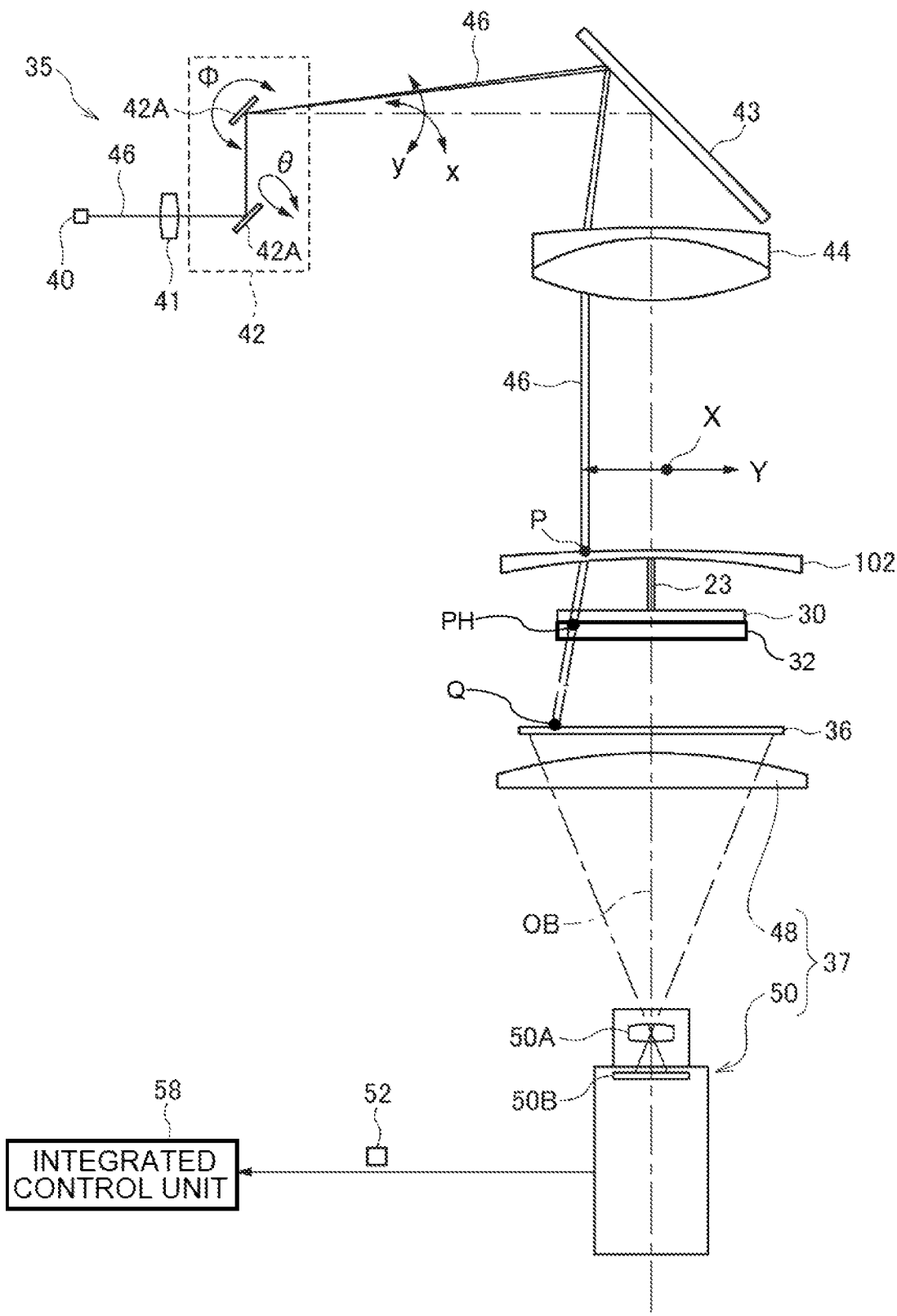
FIG. 4 is a schematic view illustrating, as a typical example, one of a pair of units each including "a scanning optical system, a screen, and a photographing optical system," and used in evaluation of an optical characteristic of left and right spectacle lenses.

Inside the lower housing 12 and the back section housing 13 as illustrated in FIG. 4 which will be described later, the lens characteristic evaluation device 10 includes: a pair of Hartmann plates 32 which are irradiated with the linear luminous fluxes 46 each passing corresponding one of the left and right spectacle lenses 102 of the spectacle frame 101 set on the setting unit 20; a pair of screens 36 on which the linear luminous fluxes 46 that have passed the pair of Hartmann plates 32 are projected; and a pair of photographing optical systems 37 each configured to capture corresponding one of the pair of screens 36.

Figure 2:
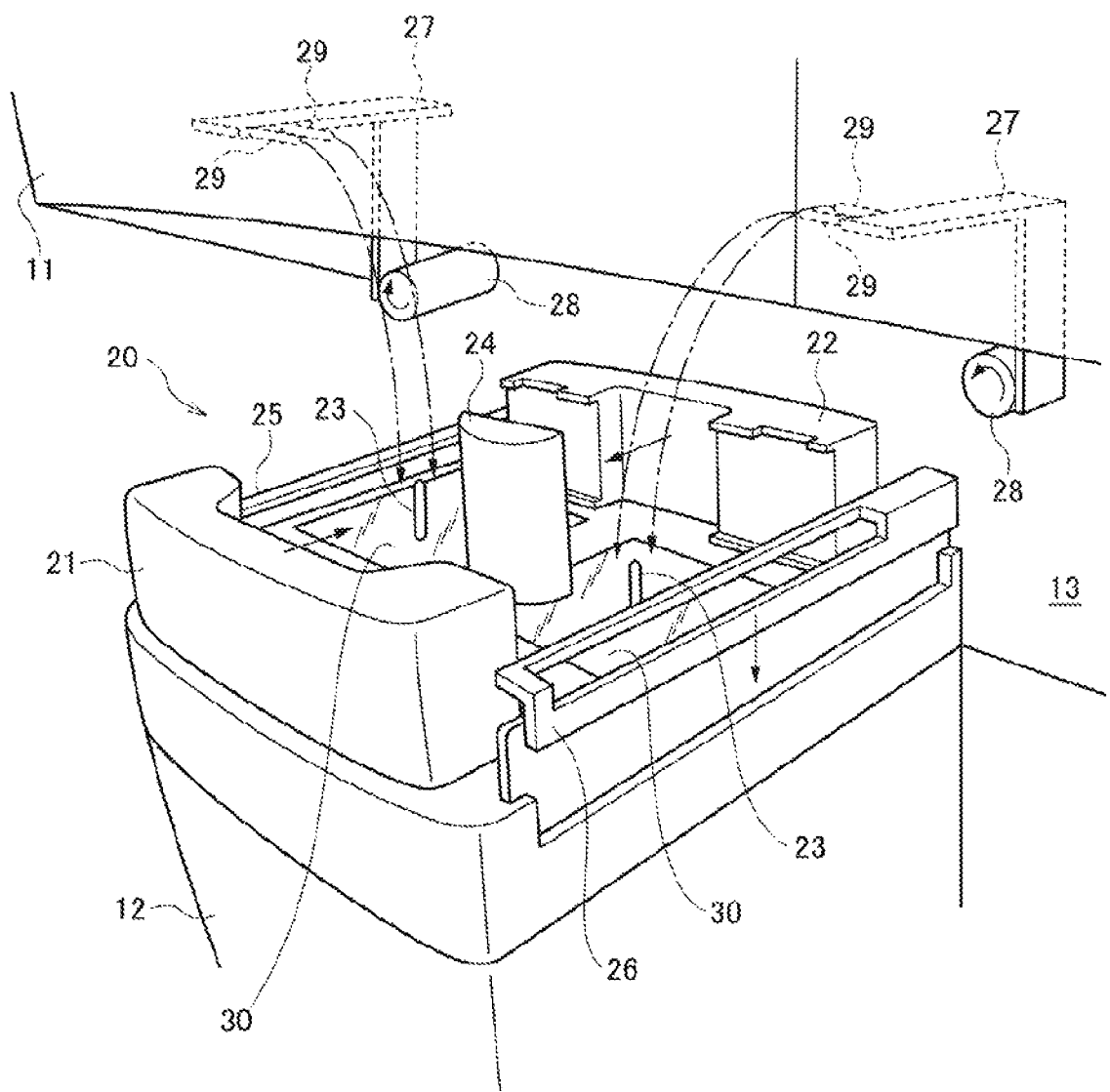
FIG. 2 is a perspective view of a setting unit.
Figure 3:
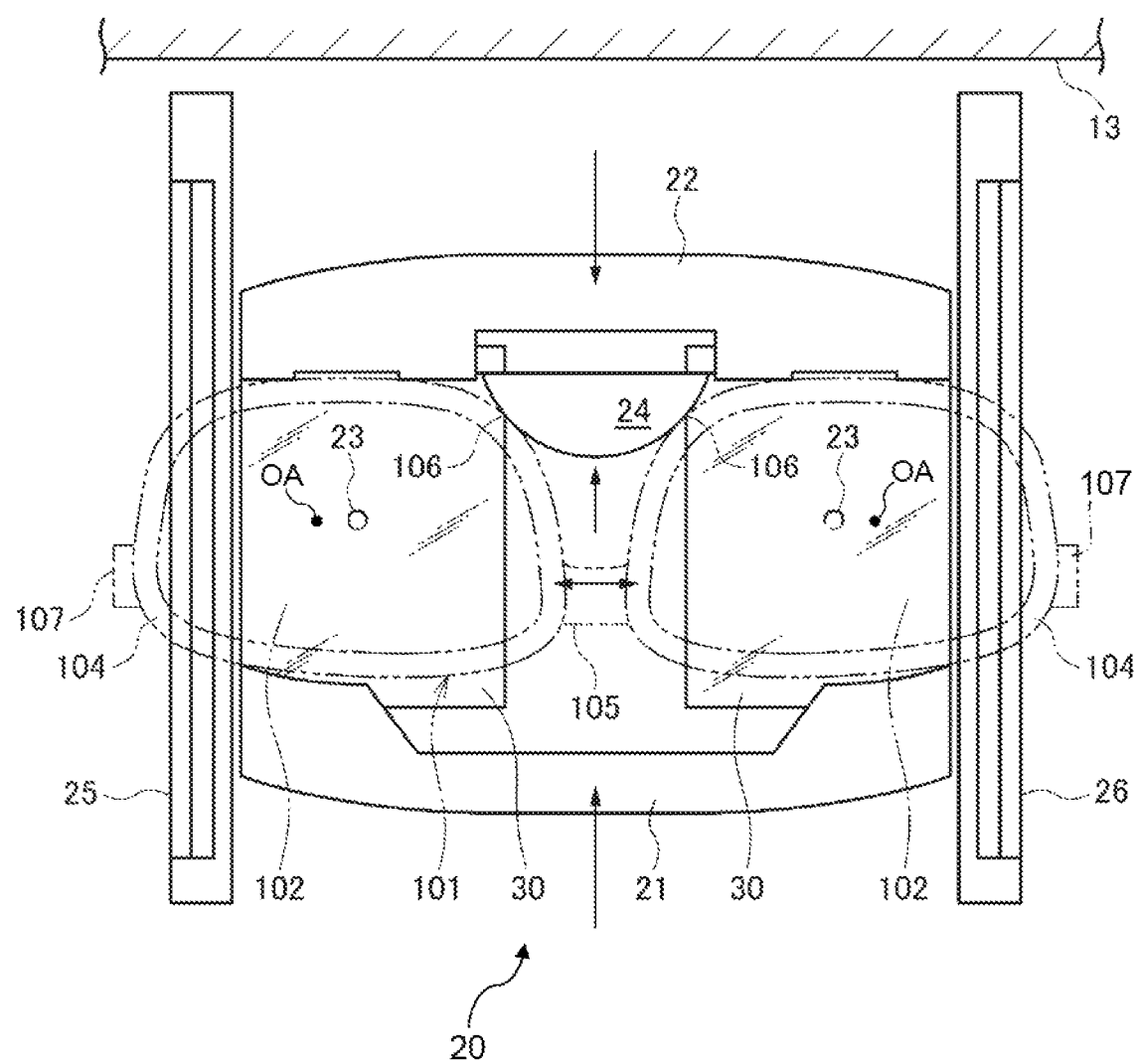
FIG. 3 is a top view of the setting unit.

FIG. 2 is a perspective view of the setting unit 20. FIG. 3 is a top view of the setting unit 20. As illustrated in FIGS. 2 and 3, a pair of clamping members 21, 22 are arranged on the setting unit 20 such that they are spaced from each other, in a front-rear direction of the lens characteristic evaluation device 10. The clamping members 21, 22 are displaceable (shiftable) in a direction in which they approach to or separate from each other, and the clamping members 21, 22 are configured to clamp the spectacle frame 101 which is set therebetween. Thereby, it is made possible to align the up-and-down direction of the spectacle frame 101 with the front-rear direction of the lens characteristic evaluation device 10 and make the surfaces of the spectacle lenses 102 opposed to the upper housing 11. Note that the rear side surfaces (rear surfaces) of the spectacle lenses 102 correspond to surfaces opposed to a face of a user (wearer) of the spectacle frame 101, and the surfaces on the opposite side thereof correspond to the front surfaces (surfaces on the front side) of the spectacle lenses 102.

Also, a pair of support pins 23 each configured to support the back side of the left and right spectacle lenses 102 of the spectacle frame 101 are provided in an upstanding manner on the setting unit 20. Each support pin 23 is arranged substantially at the midpoint (middle point) in the front-rear direction of the clamping members 21, 22. The clamping Members 21, 22 are configured to perform in positioning of the spectacle frame 101 such that the frame midpoint of the spectacle frame 101 is arranged on a line interconnecting the respective support pins 23. By virtue of this, the positions of the left and right spectacle lenses 102 can be adjusted so as to correspond to the measurement position of the lens characteristic evaluation device 10. Note that the reference sign OA in the figure indicates the optical axes OA (optical center position) of the left and right spectacle lenses 102.

Frame supports 25, 26 are provided on both of the left and right sides of the clamping members 21, 22. The frame supports 25, 26 come into contact with a part of the spectacle frame 101 and maintain a stable attitude of the spectacle frame 101.

Also, a nose pad support member 24 whose surface opposed to the front-side clamping member 21 is formed as a cylindrical peripheral surface, is arranged between the clamping members 21, 22 and substantially at the center in the left-right direction. This nose pad support member 24 is slidable rearward from the substantially central position in the front-rear direction and is urged in the forward direction by a not-shown spring or the like. In addition, the nose pad support member 24 is brought into abutment on the nose pad section 106 of the spectacle frame 101 when the spectacle frame 101 is clamped from the front and rear sides of the spectacle frame 101 by the clamping members 21, 22.

A pair of rotating shafts 28 that rotatable support corresponding one of a pair of arms 27 are provided in the back section housing 13 at a position on an upper side of the setting unit 20 in the up-and-down direction. A holding pin 29 is provided at the tip portion of each arm 27. When each arm 27 is rotated about corresponding one of the rotating shafts 28, each holding pin 29 of each arm 27 is brought into abutment on the surface of the left and right spectacle lenses 102 supported by the support pin 23 so as to press each spectacle lens 102 to the lower side in the downward direction. As a result, the left and right spectacle lenses 102 are pressed on and fixed to the support pin 23.

Support pins 23 are respectively provided in an upstanding manner on a pair of cover glasses 30 provided at a bottom portion of the setting unit 20. Cover glass 30 are respectively provided at positions where linear luminous fluxes 46 (see FIG. 4) respectively passing through corresponding one of the left and right spectacle lenses 102 supported by corresponding one of the support pins 23 are incident. The Hartmann plates 32 (see FIG. 4) provided at a lower side with respect to the cover glasses 30 are irradiated with the linear luminous faxes 46 each incident on corresponding one of the cover glasses 30.

<Scanning Optical System, Hartmann Plate, Screen, and Photographing Optical System>

FIG. 4 is a schematic view illustrating, as a typical example, one of a pair of units each including "scanning optical system 35, a Hartmann plate 32, a screen 36, and a photographing optical system 37," which is used in evaluation of an optical characteristic of the left and right spectacle lenses 102.

As illustrated in FIG. 4, the scanning optical system 35 is arranged on the upper side ("the other surface side" according to the present invention) of the spectacle lens 102 set on the setting unit 20 and includes a light source 40, a lens 41, a scanner 42, a mirror 43, and a collimator 44.

For the light source 40, for example, a laser light source, an SLD (super luminescent diode) light source, and an LED (light emitting diode) light source or the like may be used and the light source 40 is configured to emit the linear luminous flux 46 (which may also be referred to as a linear light, line luminous flux, a scanning luminous flux or a beam) as the measuring light (test light) in the visible wavelength range. The linear luminous flux 46 passing through the lens 41, the scanner 42, the mirror 43 and the collimator 44, is incident on the spectacle lens 102.

The scanner 42 is, for example, a Galvano scanner and has a structure in which two Galvano mirrors 42A (deflection mirror) respectively adapted to swing about corresponding one of swing shafts orthogonal to each other, are arranged adjacent to each other. Note that the Galvano mirror 42A on the downstream side in the traveling direction of the linear luminous flux 46 is arranged at the focal position of the collimator 44.

One of the Galvano mirrors 42A is configured to perform scanning with the linear luminous flux 46 in a first direction x by adjusting a swing angle $\theta$ of the Galvano mirror 42A in multiple stages (or without stages). Further, the other of the Galvano mirrors 42A is configured to perform scanning with the linear luminous flux 46 in a second direction y that is orthogonal to the first direction x by adjusting the swing angle $\varphi$ of the Galvano mirror 42A in multiple stages (or without stages). By virtue of this, the scanner 42 can perform two-dimensional scanning with the linear luminous flux 46 at a high speed by changing the scan angles (swing angles θ, φ) of the linear luminous flux 46 while the linear luminous flux 46 is emitted toward the mirror 43.

Note that the scanner 42 is not limited to a Galvano scanner and various types of scanners may be used that are capable to perform two-dimensionally scanning with the linear luminous flux 46 at a high speed, such as a resonance-type scanner (resonant scanner) and an MEMS (Micro Electra Mechanical Systems) scanner or the like.

The mirror 43 is configured to reflect the linear luminous flux 46 incident from the scanner 42 toward the collimator 44. The collimator 44 is configured to convert the linear luminous flux 46 incident from the mirror 43 into a parallel light which is parallel to a photographing optical axis OB of the photographing optical system 37 and then emit the light toward the spectacle lens 102 supported on the support pin 23. By virtue of this, the linear luminous flux 46 is emitted to the front surface side of the spectacle lens 102.

The scanner 42 performs scanning with the linear luminous flux 46 in two-dimensional directions (the first direction x and the second direction y). Thus, the front surface of the spectacle lens 102 is scanned with the linear luminous flux 46 in the two-dimensional directions (the first direction X and the second direction Y). Note that the first direction x and the first direction X in this embodiment are the left-right direction of the lens characteristic evaluation device 10. The second direction y is the up-and-down direction of the lens characteristic evaluation device 10 and the second direction Y is the front-rear direction of the lens characteristic evaluation device 10. By the scanning of the front surface of the spectacle lens 102 with the linear luminous flux 46, a plurality of scanning positions P on the front surface of the spectacle lens 102 are sequentially irradiated with the linear luminous flux 46. In addition, the linear luminous fluxes 46 with which the respective scanning positions P on the spectacle lens 102 are indicated, passes through the spectacle lens 102 and the cover glass 30, and is incident on the Hartmann plate 32 positioned at a lower side ("the one surface side" according to the present invention) of the spectacle lens 102 and the cover glass 30.

At this point, in this embodiment, the linear luminous flux 46 is continuously emitted from the light source 40. In this case, since the linear luminous flux 46 is scanned with a single stroke on the front surface of the spectacle lens 102, the respective scanning positions P on the front surface of the spectacle lens 102 are continuous.

Figure 5:
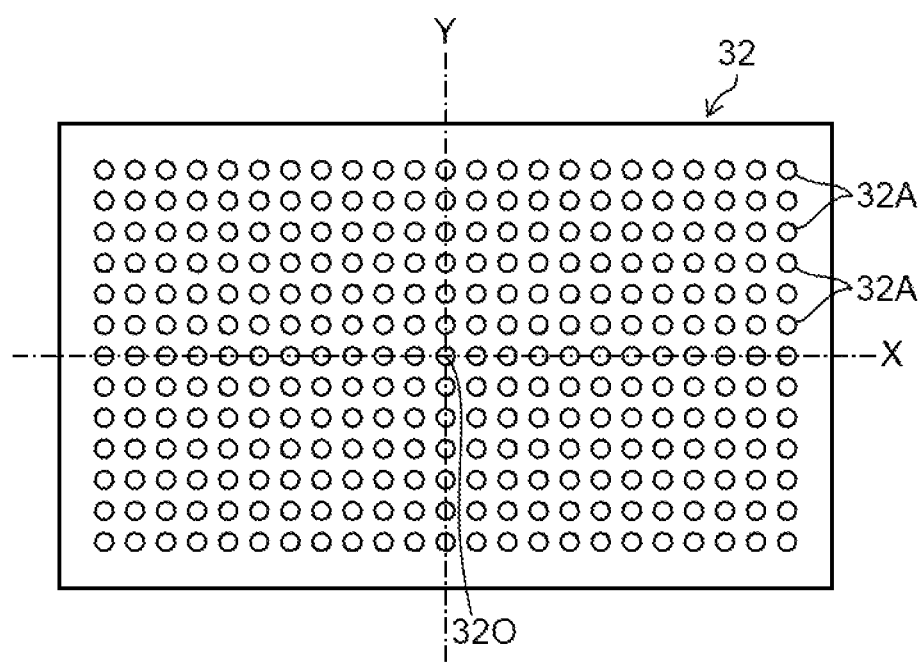
FIG. 5 is a top view of a Hartmann plate.

FIG. 5 is a top view (bottom view) of the Hartmann plate 32. As illustrated in FIGS. 4 and 5, the Hartmann plate 32 is provided at a position opposite to the scanning optical system 35 with respect to the spectacle lens 102 and the cover glass 30. More specifically, the Hartmann plate 32 is provided so as to come into contact with the lower surface of the cover glass 30. Also, the position of the Hartmann plate 32 is adjusted in advance such that its center 320 coincides with the photographing optical axis OB.

The Hartmann plate 32 is a light shielding member obtained by depositing chromium or the like on a glass substrate, for example. In this Hartmann plate 32, numerous pinholes 32A (which may also be referred to as an opening or hole) are formed in a matrix at equal intervals along the first direction X and the second direction Y (two-dimensionally arranged). For example, 13×23 pinholes 32A with a diameter of 0.5 millimeters are arranged at 2 mm pitch in this embodiment. Each pinhole 32A transmits the linear luminous flux 46. Note that the array direction and arrangement pattern of each pinhole 32A in the Hartmann plate 32 are not particularly limited. The pinholes 32A may be arranged, for example, in a circumferential pattern, a radiation pattern, or the like. Also, condenser lenses may be arranged in the respective pinholes 32A, 32B.

Figure 6:
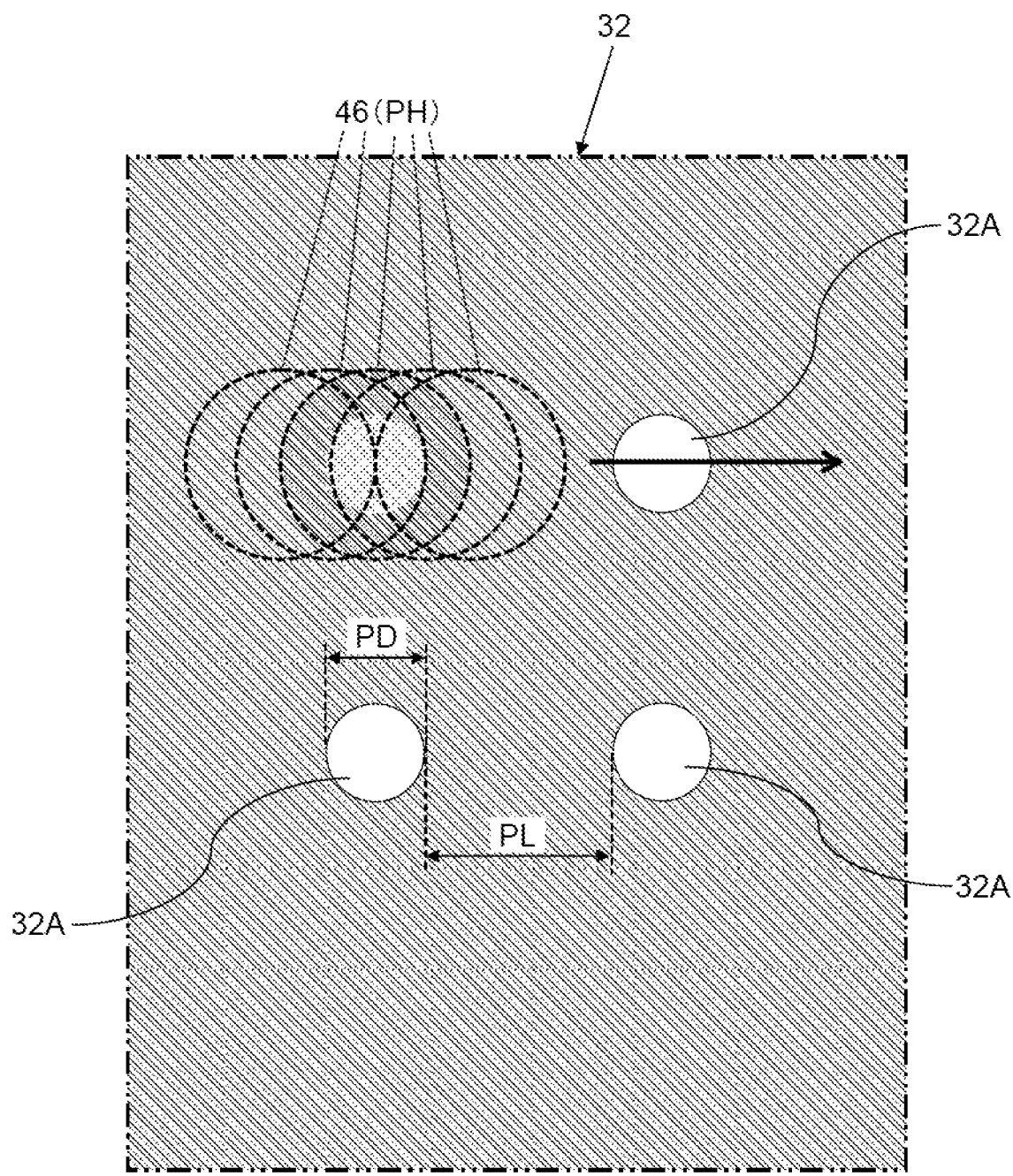
FIG. 6 is an enlarged view of a part of an upper surface of the Hartmann plate.

FIG. 6 is an enlarged view of a part of the upper surface of the Hartmann plate 32. As illustrated in FIGS. 4 and 6, when the surface of the spectacle lens 102 is continuously scanned in the two-dimensional directions with the linear luminous flux 46, as already described, the upper surface of the Hartmann plate 32 is also continuously scanned in the two-dimensional directions with the linear luminous flux 46 that passes through the spectacle lens 102, etc. and then enters the Hartmann plate 32. This successive scanning means that any of the linear luminous fluxes 46 overlaps at least with a portion of one previous linear luminous flux 46. In addition, if the scanning position PH of the linear luminous flux 46 on the upper surface of the Hartmann plate 32 coincides (which may include "approximately coincides") with the position of the pinhole 32A, then the linear luminous flux 46 passes through the pinhole 32A and is projected on the screen 36.

Here, it is preferable that the diameter (luminous flux diameter) of the linear luminous flux 46 emitted from the light source 40 is formed to be larger than the diameter PD of the pinhole 32A on the Hartmann plate 32. By virtue of this, the diameter (luminous flux diameter) of the linear luminous flux 46 that passes through the pinhole 32A and is projected on the screen 36 can be adjusted to be equal to the diameter PD. If the diameter of the linear luminous flux 46 becomes too small, there is a risk that the position detection of the point images obtained by projecting the linear luminous flux 46 on the screen 36 is not successful. Therefore, so as to make it possible to reliably perform the position detection for the point images formed by the linear luminous flux 46 the diameter of the linear luminous flux 46 is made larger than the diameter PD.

Also, it is preferable that the diameter (luminous flux diameter) of the linear luminous flux 46 emitted from the light source 40 is smaller than the distance PL of two adjacent pinholes 32A on the Hartmann plate 32.

FIG. 7 is an explanatory diagram for explaining the reason why an upper limit is set for the diameter of the linear luminous flux 46. As illustrated in FIG. 7, if the diameter of the linear luminous flux 46 is larger than the distance PL, the linear luminous flux 46 may simultaneously pass through two adjacent pinholes 32A and be individually projected on the screen 36. In this case, as illustrated in a part indicated by the reference sign 7A in FIG. 7, if the spectacle lens 102 is a lens with a minus power or weak plus power, the point images of the two linear luminous fluxes 46 simultaneously projected on the screen 36 are separated (isolated) from each other.

In contrast to this, as illustrated in a part indicated by the reference sign 7B in FIG. 7, if the spectacle lens 102 is a lens with a strong plus power, the point images by the two linear luminous fluxes 46 simultaneously projected on the screen 36 are overlapped with each other, so that it is difficult to separate these two point images from each other and detect them as separate ones. Also, as illustrated in a part indicated by the reference sign 7C in FIG. 7, if the spectacle lens 102 is a lens with a further stronger plus power, then the linear luminous fluxes 46 that have passed through the two adjacent pinholes 32A intersect with each other at a location before the screen 36, so that the positional relationship is inverted between the point images by two linear luminous fluxes 46 simultaneously projected on the screen 36.

Accordingly, in this embodiment, the diameter of the linear luminous flux 46 is formed to be smaller than the distance PL and thereby preventing overlapping of the point images and inversion of the positional relationship between the point images by the two linear luminous fluxes 46.

Referring again to FIG. 4, the screen 36 is provided on the lower side relative to the Hartmann plate 32. The screen 36 is, for example, a sand-applied glass substrate or the like and has diffuse transmission property. On this screen 36, the linear luminous flux 46 that have passed through the pinhole 12A of the Hartmann plate 32 is projected. In addition, as the scanner 42 performs scanning with the linear luminous flux 46 in the two-dimensional directions, the pinhole 32A through which the linear luminous flux 46 passes, changes in response to the scanning. In accordance with the change in the pinhole, the projection position Q of the linear luminous flux 46 projected on the screen 36, also changes.

Accordingly, in this embodiment, while details will be described later, the angle of inclination of the linear luminous flux 46 passing through the spectacle lens 102 and projected on the screen 36, can be detected by detecting the projection position Q of the linear luminous flux 46 projected on the screen 36 and determining (identifying) the position of the pinhole 32A through which this linear luminous flux 46 have passed.

The photographing optical system 37 is provided on a side opposite to the Hartmann plate 32 with respect to the screen 36, i.e., on the lower side with respect to the screen 36. The photographing optical system 37 is configured to photograph the screen 36 on which the linear luminous flux 46 is projected from the lower side of the screen 36. This photographing optical system 37 includes, from its upper side toward the lower side, a field lens 48 and a camera 50. The field lens 48 is configured to cause an image of the screen 36 on which the linear luminous flux 46 is projected to enter the camera 50.

The camera 50 includes an imaging lens 50A and a CCD (Charge Coupled Device) type or CMOS (complementary metal oxide semiconductor) type imaging element 50B. The imaging lens 50A is configured to cause the image of the screen 36 entering via the field lens 48 to enter the imaging surface of the imaging element 50B.

The imaging element 50B is configured to continuously capture the images of the screen 36 incident via the imaging lens 50A while the scanning of the linear luminous flux 46 by the scanning optical system 35 is being carried out. By virtue of this, the captured image 52 of the screen 36 continuously photographed by the camera 50 is output from the camera 50 to an integrated control unit 58 which will be described later.

<Integrated Control Unit>

Figure 8:
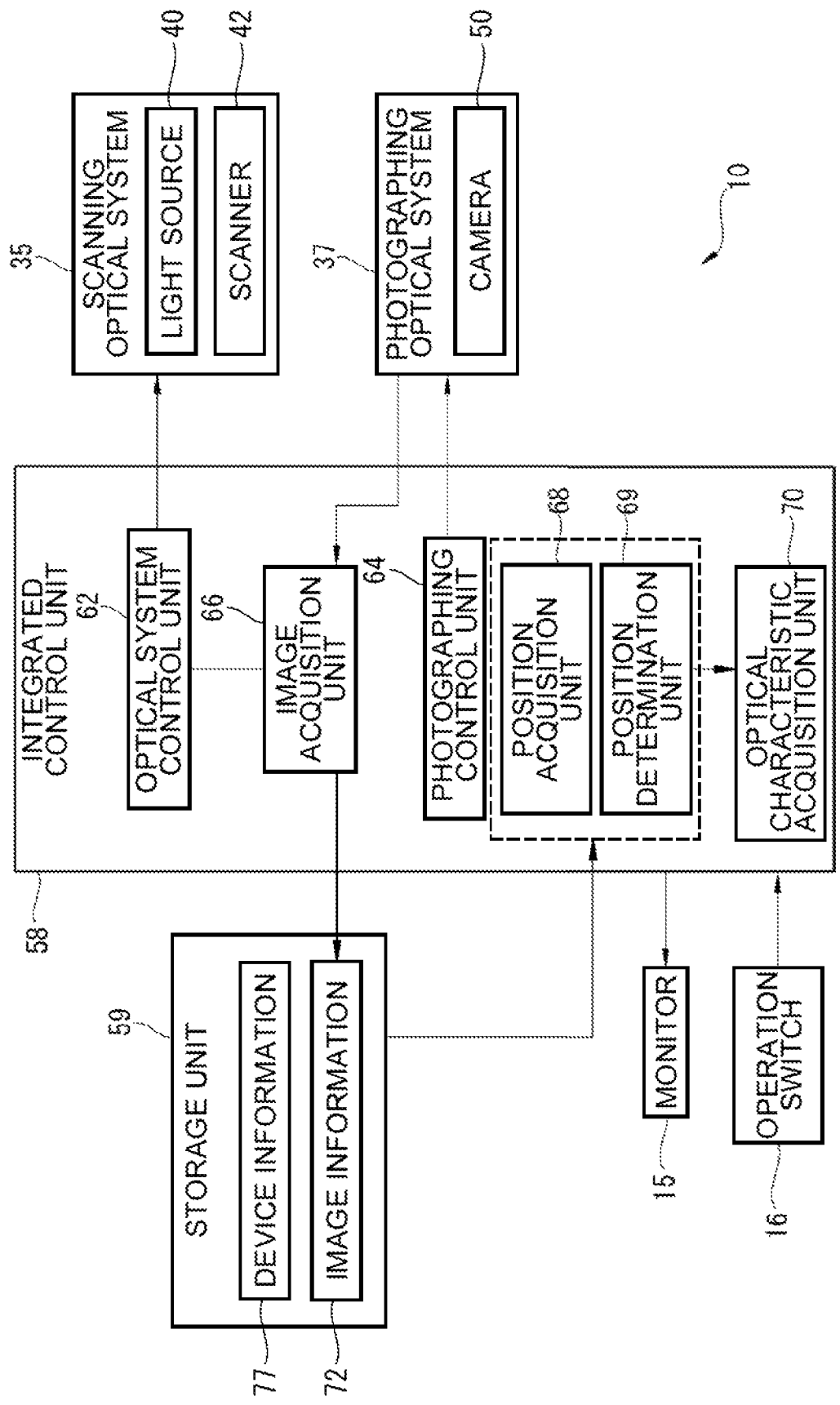
FIG. 8 is a functional block diagram of an integrated control according to the first embodiment.

FIG. 8 is a functional block diagram of the integrated control unit 58 of the first embodiment. The integrated control unit 58 is provided inside the lower housing 12 or the back section housing 13 of the lens characteristic evaluation device 10. As illustrated in FIG. 8, the integrated control unit 58 is an arithmetic circuit configured, for example, by an arithmetic unit of various types such as CPU (Central Processing Unit) or FPGA (field-programmable gate array), a memory unit, and the like. The integrated control unit 58 controls, in an integrated manner, the various units of the lens characteristic evaluation device 10 on the basis of the various types of operation instructions entered by the operation switches 16. Also, a storage unit 59 is connected to the integrated control unit 58.

The integrated control unit 58 executes not-shown software programs in the storage unit 59 and thereby functions as an optical system control unit 62, a photographing control unit 64, an image acquisition unit 66, a position acquisition unit 68, a position determination unit 69, and an optical characteristic acquisition unit 70.

The optical system control unit 62 is configured to control radiation of the linear luminous flux 46 by the light source 40 of the scanning optical system 35 and driving of the scanner 42 (the scan angle of the linear luminous flux 46). The optical system control unit 62 in accordance with an input of the evaluation start operation to the operation switches 16, causes execution of the continuous emission in the two-dimensional directions of the linear luminous flux 46 from the light source 40 and the scanning in the two-dimensional direction with the linear luminous flux 46 by the scanner 42 with a predetermined scanning pattern. By virtue of this, the surface of the spectacle lens 102 is scanned in the two-dimensional directions with the linear luminous flux 46, at the same time, the upper surface of the Hartmann plate 32 is scanned in the two-dimensional directions with the linear luminous flux 46 which has passed through the spectacle lens 102.

The photographing control lint 64 is configured to control photographing of the screen 36 by the camera 50. The photographing control unit 64 is configured to cause the photographing of the screen 36 by the camera 50 to be carried out continuously while scanning with the linear luminous flux 46 by the scanning optical system 35 is being carried out. By virtue of this, the captured images 52 of the screen 36 are continuously input from the camera 50 to the image acquisition unit 66 which will be described later.

Here, if the photographing by the camera 50 is carried out at a timing at which the scanning position PH of the linear luminous flux 46 coincides with the position of the pinhole 32A, the captured image 52 obtained by this photographing includes point images formed by the linear luminous flux 46 projected on the screen 36. Note that, in this embodiment, the afore-mentioned optical system control unit 62 controls the scanning speed of the linear luminous flux 46 by the scanning optical system 35 such that each of the captured images 52 includes one point image formed by the linear luminous flux 46.

Meanwhile, if the photographing by the camera 50 is carried out at a timing at which the scanning position PH of the linear luminous flux 46 does not coincide with the position of the pinhole 32A, the captured image 52 obtained by this photographing does not include the point image formed by the linear luminous flux 46.

The image acquisition unit 66 is configured to sequentially acquire the captured images 52 from the camera 50. Also, at the same time, the image acquisition unit 66 sequentially acquires, from the optical system control unit 62 and the like, a scan angle of the linear luminous flux 46 (the swing angles $\theta$, $\varphi$ of the respective Galvano mirrors 42A) emitted from the scanner 42 at the time of photographing of the captured image 52. This scan angle of the linear luminous flux 46 is information indicating the scanning position P at which the linear luminous flux 46 was radiated on the surface of the spectacle lens 102. In addition, the image acquisition unit 66 stores the captured image 52 acquired from the camera 50 in the image information 72 (see FIG. 9) of the storage unit 59 in a state where the scan angle of the linear luminous flux 46 is identifiable.

Figure 9:
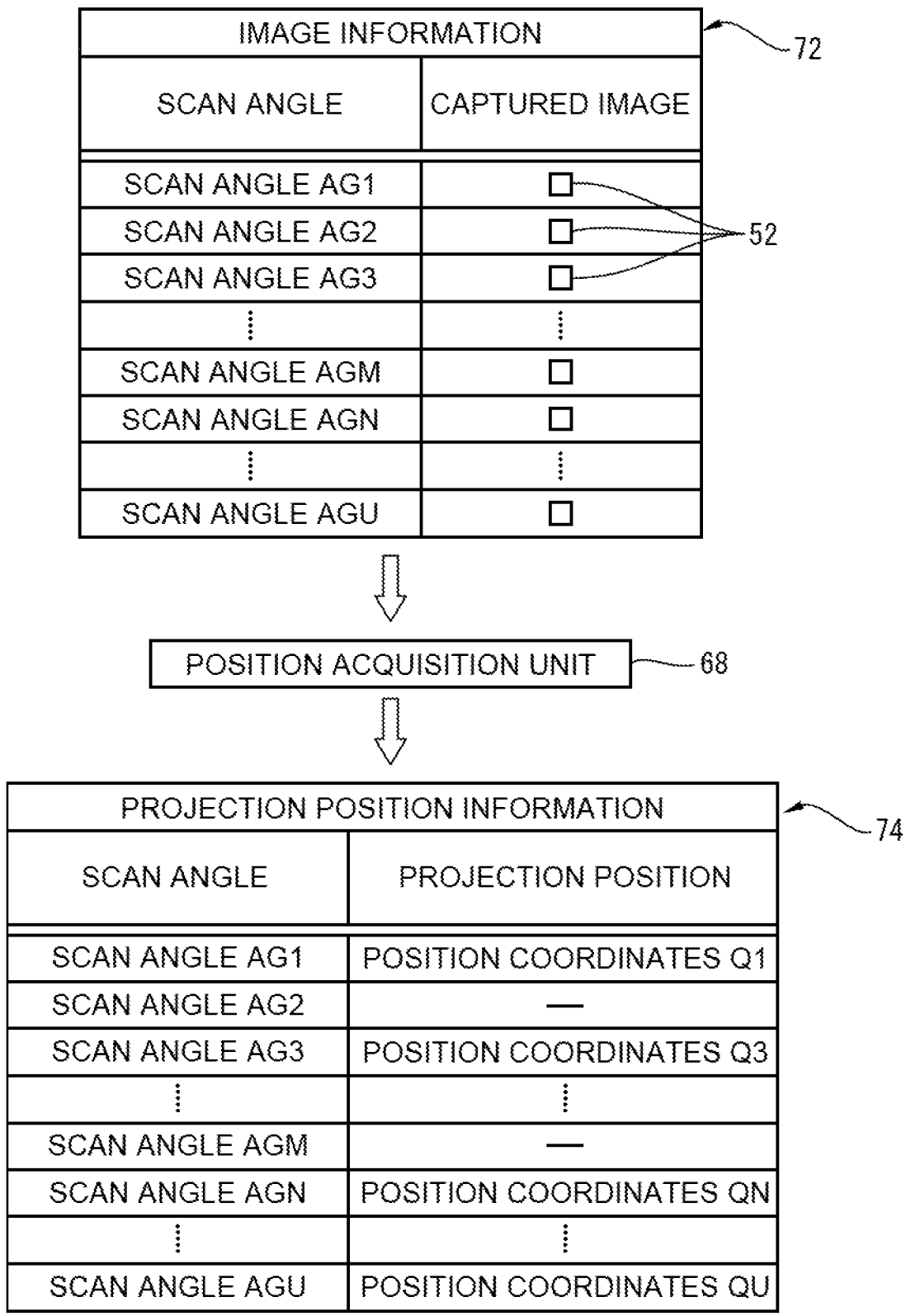
FIG. 9 is an explanatory diagram of image information and photographing position information which a position acquisition unit acquires based on this image information.

FIG. 9 is an explanatory diagram of the image information 72 and the projection position information 74 which the position acquisition unit 68 acquires based on this image information 72. As illustrated in FIG. 9, the respective captured images 52 that are input continuously from the image acquisition unit 66 are stored in the image information 72 in a state where the images 52 are associated with the scan angles (scanning positions P) of the linear luminous fluxes 46 corresponding thereto.

The position acquisition unit 68 is configured to acquire, from the captured image 52, position coordinates of the projection position Q of the linear luminous flux 46 projected on the screen 36. This position acquisition unit 68 acquires the image information 72 from the storage unit 59 when the scanning with the linear luminous flux 46 by the scanning optical system 35 and the photographing of the screen 36 by the camera 50 are completed. In addition, the position acquisition unit 68 analyzes the respective captured images 52 in the image information 72 and determines the captured image 52 that includes the point image formed by the linear luminous flux 46 from among the respective captured images 52. Subsequently, the position acquisition unit 68 generates the projection position information 74 from the respective captured images 52 including the point image formed by the linear luminous flux 46 on the basis of the result of acquiring the position coordinates of the projection position Q of the linear luminous flux 46. Note that the position coordinates of the projection position Q are coordinates whose origin is, for example, the point intersecting with the photographing optical axis OB on the screen 36.

The respective scan angles of the linear luminous flux 46 corresponding to the captured images 52 including the point image formed by the linear luminous flux 46 and position coordinates of the projection positions Q corresponding to the respective scan angles are stored in the projection position information 74 such that they are associated with each other. This projection position information 74 is output from the position acquisition unit 68 to the position determination unit 69 and the optical characteristic acquisition unit 70 respectively.

Figure 11:
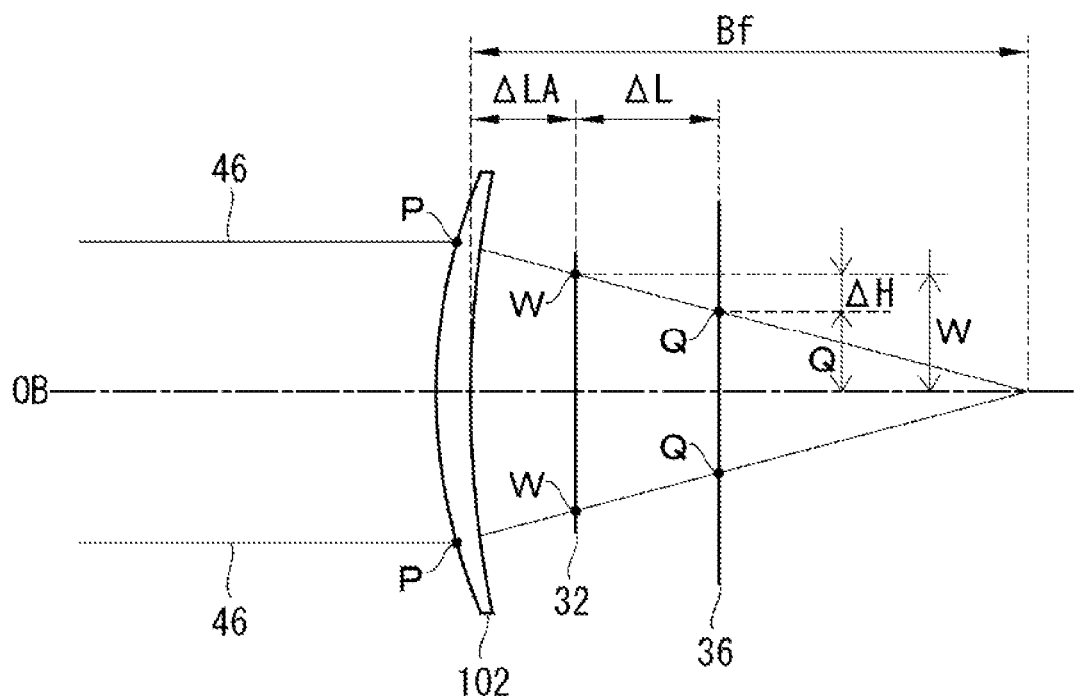
FIG. 11 is an explanatory diagram for explaining acquisition of an optical center position of a spectacle lens and acquisition of a back focus by an optical characteristic acquisition unit.

Referring again to FIG. 8, the position determination unit 69 determines the pinhole 32A of the Hartmann plate 32 through which the linear luminous flux 46 projected on the screen 36 has passed and the pinhole position W which is the position of the determined pinhole 32A (see FIG. 11). The position determination unit 69 acquires the projection position information 74 from the position acquisition unit 68 when the scanning with the linear luminous flux 46 by the scanning optical system 35 and the photographing of the screen 36 by the camera 50 are completed, and refers to the device information 77 in the storage unit 59.

Figure 10:
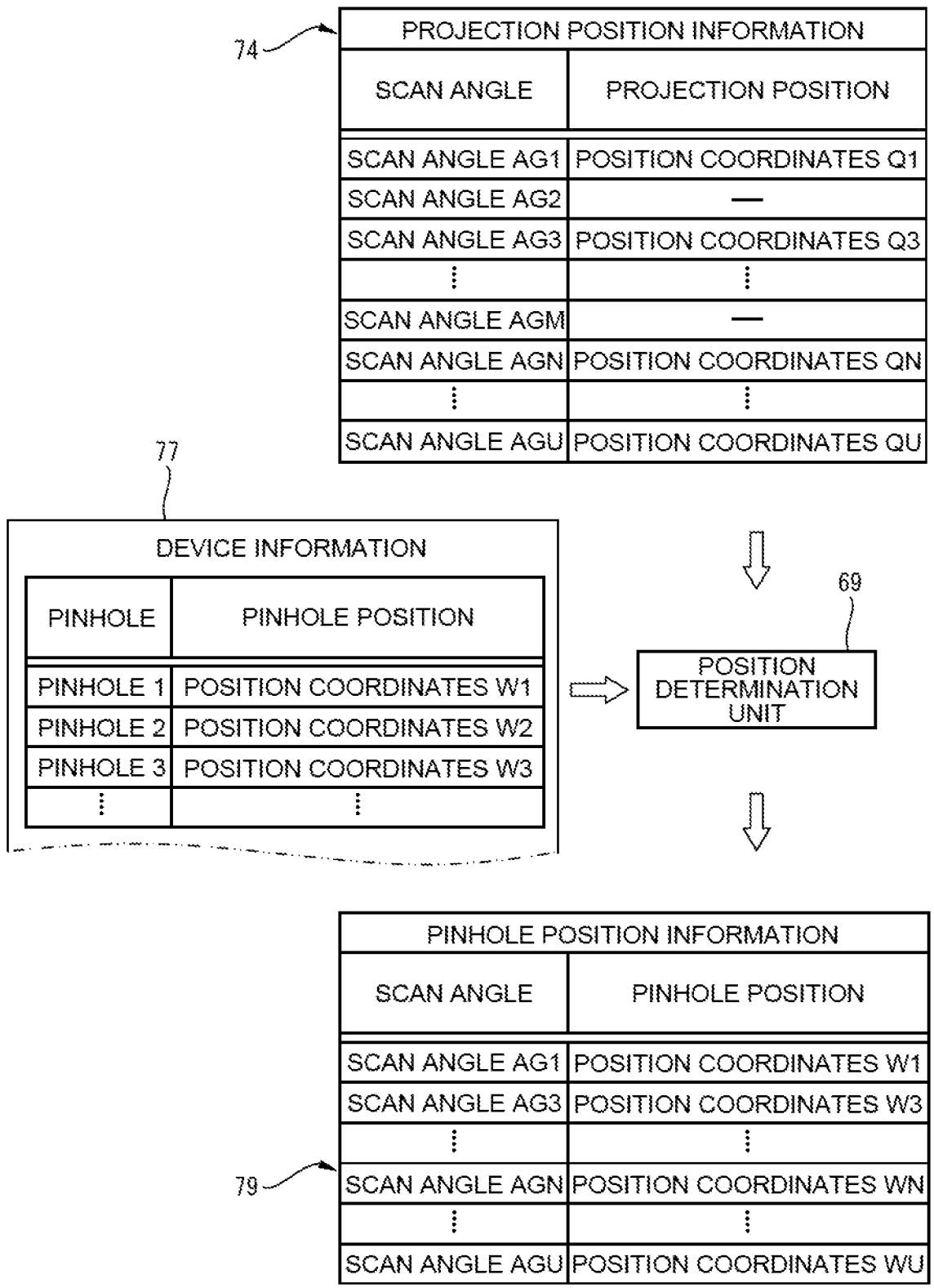
FIG. 10 is an explanatory diagram for explaining determination processing by a position determination unit to determine a pinhole and its position.

Stored in advance in the device information 77 are: the information regarding the positions of the Hartmann plate 32 and the screen 36 on the photographing optical axis OB and the position coordinates of the respective pinholes 32A in the Hartmann plate 32, as illustrated in FIG. 10 which will be described later. Note that the position coordinates of the respective pinholes 32A are coordinates whose origin is the center 320 of the Hartmann plate 32 (the center 320 whose position is adjusted in accordance with the photographing optical axis OB).

FIG. 10 is an explanatory diagram for explaining the determination processing to determine the pinhole 32A and its position by the position determination unit 69. As illustrated in FIG. 10, the position determination unit 69 first determines (identifies) the pinhole 32A of the Hartmann plate 32 through which the linear luminous flux 46 projected on the screen 36 has passed on the basis of the projection position information 74.

Specifically, the scanning position P of the linear luminous flux 46 (radiation position of the linear luminous flux 46 from the collimator 44 with respect to the spectacle lens 102) is obtained on the basis of the scan angle of the linear luminous the 46 (the swing angles θ, φ of the respective Galvano mirrors 42A). Here, although the refraction angle of the linear luminous flux 46 that has passed through the spectacle lens 102 may vary depending on the types of the spectacle lens 102 (plus power, minus power, magnitude of the power, etc.), the projection position Q on the screen 36 of the linear luminous flux 46 that has passed through the spectacle lens 102 has been already obtained by the projection position information 74.

Meanwhile, in the lens characteristic evaluation device 10, the positions of respective pinholes 32A in the Hartmann plate 32 are fixed. Also, the positional relationship between the Hartmann plate 32 and the screen 36 is also fixed and the angle of inclination of the linear luminous flux 46 is constant after the linear luminous flux 46 has passed through the spectacle lens 102 until the linear luminous flux 46 is projected on the screen 36.

In addition, since the influence of the refraction by the spectacle lens 102 is small on the linear luminous flux 46 that has passed through the optical center portion of the spectacle lens 102 and radiated on the center portion of the Hartmann plate 32, the deviation between the scanning position P and the projection position Q becomes small. As a result, the pinhole 32A through which the linear luminous flux 46 has passed can be determined with high precision by first analyzing the scanning position P and the projection position. Q corresponding to the center portion of the spectacle lens 102. Subsequently, using the pinhole position W of this pinhole 32A (see FIG. 11) as a reference, the pinhole 32A through which the linear luminous flux 46 passing a portion other than the optical center portion of the spectacle lens 102 has passed can also be determined on the basis of the scan angle (scanning position P) of the linear luminous flux 46 and the projection position Q of the linear luminous flux 46, and the device information 77 (the pinhole positions W of the respective pinholes 32A (see FIG. 11)).

Accordingly, the position determination unit 69 can determine the pinhole position W of the pinhole 32A through which the linear luminous flux 46 has passed on the basis of the scan angle (scanning position P) of the linear luminous flux 46, the projection position Q of the linear luminous flux 46 on the screen 36, and the pinhole positions W of the respective pinholes 32A stored in the device information 77 (see FIG. 11).

In addition, the position determination unit 69 outputs, to the optical characteristic acquisition unit 70, the pinhole position information 79 indicating the correspondence relationship between the scan angles of the respective linear luminous fluxes 46 and the pinhole positions W each corresponding to the respective linear luminous fluxes 46 (see FIG. 11).

Note that the position determination unit 69 may carry out the determination of the pinholes 32A through which the respective linear luminous fluxes 46 have passed and their pinhole positions W (see FIG. 11) using another method. For example, a while color light is used as the linear luminous flux 46, and a filter that transmits a light of a particular wavelength range (red color light, green color light, blue color light, etc.) is provided in a predetermined one or plurality of pinholes 32A in the Hartmann plate 32. Note that when filters are to be provided in a plurality of the pinholes 32A, the types of the filters (the wavelength range of the transmitted light) may vary for each pinhole 32A. Also, as the imaging element 50B, a color imaging element is used.

In this example, the position determination unit 69 can distinguish between the captured image 52 including the point images formed by the linear luminous flux 46 that has passed through the pinhole 32A provided with a filter (hereinafter referred to as "first captured image 52") and the captured image 52 including the point images formed by the linear luminous flux 46 that passed the pinhole 32A without a filter (hereinafter referred to as "second captured image 52"), by analyzing the respective captured images 52 in the image information 72.

In addition, when the pinhole position W of the pinhole 32A provided with the filter in the Hartmann plate 32 (see FIG. 11) and the scanning pattern of the linear luminous flux 46 are stored in advance in the device information 77, the position determination unit 69 can readily determine the pinhole position W corresponding to the first captured image 52 simply by referring to the device information 77.

Subsequently, the position determination unit 69 can determine the positions of the pinholes 32A without a filter corresponding to the respective second captured images 52 on the basis of the order of photographing of the respective first captured images 52 and the respective the second captured images 52, the scanning pattern of the linear luminous flux 46 and the positional relationships among the respective pinholes 32A of the Hartmann plate 32, using the position of the pinhole 32A with the filter, determined in advance, as a reference.

Referring again to FIG. 8, the optical characteristic acquisition unit 70 acquires the optical center position (optical axis OA) of the spectacle lens 102 and the optical characteristic (back focus Bf (see FIG. 11), etc.) on the basis of the projection position information 74 input from the position acquisition unit 68, the pinhole position information 79 input from the position determination unit 69, and the device information 77 in the storage unit 59.

FIG. 11 is an explanatory diagram for explaining the acquisition of the optical center position (optical axis OA) of the spectacle lens 102 and acquisition of the back focus Bf by the optical characteristic acquisition unit 70. As illustrated in FIG. 11, the pinhole positions W of the pinholes 32A through which the linear luminous fluxes 46 have respectively passed and the projection positions Q on the screen 36 of the respective linear luminous fluxes 46 are obtained on the basis of the projection position information 74 and the pinhole position information 79. As a result, the optical characteristic acquisition unit 70 detects the angles of inclination of the respective linear luminous fluxes 46 projected on the screen 36 respectively on the basis of the pinhole position W and the projection position Q for each linear luminous flux 46 projected on the screen 36. By virtue of this, the optical characteristic acquisition unit 70 can acquire (compute) the optical center position of the spectacle lens 102. i.e., the position of the optical axis OA, from the scanning position P at which the linear luminous flux 46 that is in parallel with the optical axis OB is emitted.

Also, since the positions of the Hartmann plate 32 and the screen 36 on the individual capture optical axes OB are known based on the device information 77, the distance ΔL between the Hartmann plate 32 and the screen 36 is known. Further, since the set position of the spectacle lens 102 is known, the distance ΔLA between the back side of the spectacle lens 102 and the Hartmann plate 32 is known. Also, the difference ΔH (the difference in the perpendicular direction with respect to the photographing optical axis OB) between the pinhole position W and the projection position Q can also be obtained for each linear luminous flux 46 projected on the screen 36. Accordingly, on the basis of these pieces of information, the optical characteristic acquisition unit 70 can acquire (compute) the back focus Bf of the spectacle lens 102.

Note that, with regard to the Hartmann plate 32, the screen 36, and the photographing optical system 37, the lens characteristic evaluation device 10 is basically the same as a conventional device that irradiates the spectacle lens 102 with a large-diameter measuring light as illustrated in FIG. 22. As a result, the optical characteristic acquisition unit 70 can obtain the optical center position and the back focus Bf of the spectacle lens 102 by basically the same computation method as that of the conventional device, as long as the pinhole position W and the projection position Q for each linear luminous flux 46 are obtained. Also, the optical characteristic acquisition unit 70 can also obtain optical characteristics of the spectacle lens 102 other than the back focus Bf using the same or similar method as that of the conventional device. Further, the optical characteristic acquisition unit 70 can also acquire the mapping image indicating the distribution of the optical characteristic values in the spectacle lens 102 using the same or similar method as that of the conventional device.

The optical characteristic acquisition unit 70 outputs and displays the information regarding the acquired optical center position (optical axis OA) of the spectacle lens 102 and the optical characteristic (back focus Bf, etc.) on the monitor 15.

<Operation of the Lens Characteristic Evaluation Device According to the First Embodiment>

Figure 12:
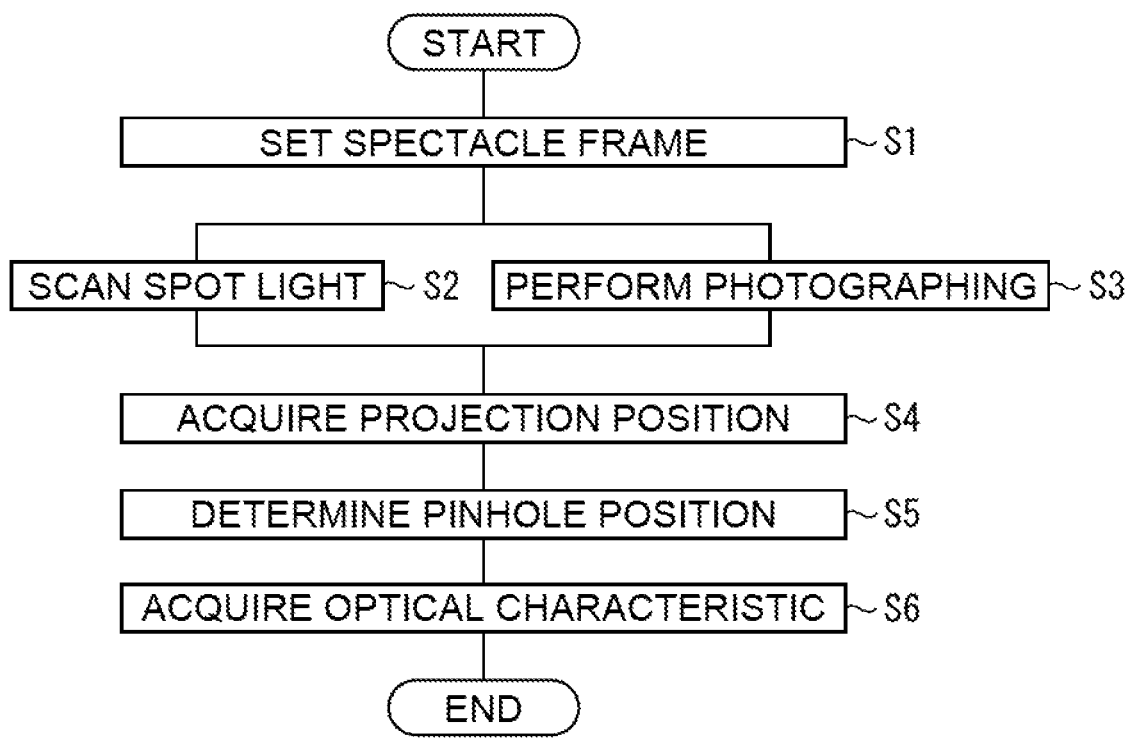
FIG. 12 is a flowchart illustrating a flow of evaluation processing of optical characteristic of left and right spectacle lenses of a spectacle frame by a lens characteristic evaluation device according to the first embodiment.

FIG. 12 is a flowchart that illustrates a flow of the evaluation processing to evaluate the optical characteristics of the left and right spectacle lenses 102 of the spectacle frame 101 by the lens characteristic evaluation device 10 according to the first embodiment (the method of operating the lens characteristic evaluation device). Note that, while the lens characteristic evaluation device 10 evaluates the optical characteristics of the left and right spectacle lenses 102 simultaneously or in a chronological fashion, the explanations herein are given based on the example of evaluation of the optical characteristic of either of the left and right spectacle lenses 102.

An examiner sets the spectacle frame 101 to be tested on the setting unit 20, clamps the spectacle frame 101 by the clamping members 21, 22, and presses the spectacle lens 102 supported by the support pin 23 on the holding pin 29 to secure it thereto (step S1). Note that, after the spectacle frame 101 has been set on the setting unit 20, the spectacle frame 101 may be automatically secured by driving the clamping members 21, 22 and the holding pin 29 by a not-shown motor driving mechanism or the like in accordance with the evaluation start operation by the operation switches 16.

Subsequently, when the examiner enters the evaluation start operation by the operation switches 16, the optical system control unit 62 continuously emits the linear luminous flux 46 from the light source 40 and causes at least either one of the two Galvano mirrors 42A of the scanner 42 to be displaced in accordance with a predefined scanning pattern. By virtue of this, the linear luminous flux 46 is emitted for scanning in the two-dimensional directions with the scanning pattern on the surface of the spectacle lens 102 (step S2).

In addition, in accordance with the scanning with the linear luminous flux 46 on the front surface of the spectacle lens 102, as has been illustrated in FIG. 6, the linear luminous flux 46 that has passed through the spectacle lens 102 and the cover glass 30 is scanned in the two-dimensional directions on the upper surface of the Hartmann plate 32. By virtue of this, on the upper surface of the Hartmann plate 32, if the scanning position PH of the linear luminous flux 46 coincides with the position of the pinhole 32A, the linear luminous flux 46 passes through this pinhole 32A and is projected on the screen 36. As a result of this, the linear luminous fluxes 46 pass through the respective pinhole 32A of the Hartmann plate 32 so as to be projected on the screen 36.

A conventional device irradiates the spectacle lens 102 with the measuring light having a large-diameter corresponding to the measurement range of the spectacle lens 102 (see FIG. 22). In contrast to the conventional device, in this embodiment, since the linear luminous flux 46 having a small-diameter is emitted for scanning on the surface of the spectacle lens 102, it is made possible to ensure sufficient luminance of the light source 40. In addition, because of the light distribution of the light source 40, it is possible to prevent creation of difference in the brightness in the point images formed by the linear luminous flux 46 between a center portion and a peripheral portion of the captured image 52. As a result, when compared with the conventional device, the variation (difference) in the light quantity of the point images between the center portion and the peripheral portion of the captured image 52 is decreased, so that darkening of the peripheral portion of the captured image 52 and whiteout of the point image at the center portion of the captured image 52 are prevented. Thus, it is possible to prevent the degradation in the evaluation sensitivity at the center portion and the peripheral portion of the captured image 52.

Meanwhile, the photographing control unit 64 controls the camera 50 while the scanning of the linear luminous flux 46 is being carried out, and causes the camera 50 to perform the continuous photographing of the screen 36 (step S3). In addition, the captured images 52 of the screen 36 photographed by the camera 50 are sequentially output to the image acquisition unit 66. The image acquisition unit 66 sequentially stores them in the image information 72 in the storage unit 59 in a state where the scan angles of the linear luminous flux 46 (the swing angles θ, φ of the respective Galvano mirrors 42A) are identifiable.

In the course of this, in this embodiment, the scanning speed of the linear luminous flux 46 by the scanning optical system 35 is controlled such that the number of the point images formed by the linear luminous flux 46 and included in the individual captured images 52 becomes one. As a result, as illustrated in the parts indicated by the reference signs 7B and 7C in FIG. 7, even when the spectacle lens 102 is a convex lens with a strong plus power, it is possible to prevent overlapping of the point images formed by the linear luminous flux 46 projected on the screen 36 and inversion of the positional relationship. By virtue of this, the screen 36 does not need to be moved as in the above-mentioned Japanese Patent Application Laid-Open No. 2005-274473, so that the problem of increase in the size of the lens characteristic evaluation device 10 and securing the reproducibility of the movement distance of the screen 36 will no arise.

When the scanning with the linear luminous flux 46 by the scanning optical system 35 and the continuous photographing of the screen 36 by the camera 50 are completed, the position acquisition unit 68 analyzes the respective captured images 52 in the image information 72 stored in the storage unit 59 and carries out the determination of the captured image 52 that includes the point images formed by the linear luminous flux 46, and the acquisition of the position coordinates of the projection positions Q of the linear luminous fluxes 46 (step S4). In addition, the position acquisition unit 68 generates the projection position information 74 as illustrated FIG. 9 and outputs the projection position information 74 to the position determination unit 69 and the optical characteristic acquisition unit 70, respectively.

Subsequently, the position determination unit 69 determines the pinhole positions W of the pinholes 32A through which the respective linear luminous fluxes 46 have passed on the basis of the projection position information 74 input from the position acquisition unit 68 (the scan angles and the projection positions Q of the linear luminous fluxes 46) and the device information 77 in the storage unit 59 (the pinhole position W for each pinhole 32A) (step S5). In addition, the position determination unit 69 generates the pinhole position information 79 as illustrated in FIG. 10 and outputs this pinhole position information 79 to the optical characteristic acquisition unit 70.

The optical characteristic acquisition unit 70, which has received the inputs of the projection position information 74 and the pinhole position information 79, determines the pinhole positions W of the pinholes 32A through which the respective linear luminous fluxes 46 have respectively passed and the projection positions Q on the screen 36 of the respective linear luminous fluxes 46 on the basis of these pieces of information. Subsequently, on the basis of this determination result, the optical characteristic acquisition unit 70 detects the angles of inclination of the respective linear luminous fluxes 46 projected on the screen 36 respectively.

In addition, the optical characteristic acquisition unit 70 acquires the optical center position (optical axis OA) and the optical characteristic (back focus K, etc.) of the spectacle lens 102 on the basis of the angles of inclination of the respective linear luminous fluxes 46 and the device information 77 in the storage unit 59, as illustrated in FIG. 11, using basically the same computation method (analysis method) as that of the conventional device (see FIG. 22) (step S6). The results of evaluation of the optical characteristic and the like of the spectacle lens 102 by the optical characteristic acquisition unit 70 are output and displayed on the monitor 15.

Effect of the Lens Characteristic Evaluation Device According to the First Embodiment As described in the foregoing, in the lens characteristic evaluation device 10 according to the first embodiment, by scanning the linear luminous flux 46 on the surface of the spectacle lens 102, it is possible to prevent difference in the brightness of the point images formed by the linear luminous flux 46 between the center portion and the peripheral portion of the captured image 52. Therefore, it is possible to prevent the degradation in the evaluation sensitivity in the center portion and the peripheral portion of the captured image 52. Also, since it is possible to prevent the overlapping of the point images formed by the linear luminous flux 46 projected on the screen 36 and the inversion of the positional relationship without providing a moving mechanism to move the screen 36, the size of the lens characteristic evaluation device 10 is not increased. As a result of this, both prevention of degradation in the evaluation sensitivity in the center portion and the peripheral portion of the captured image 52 and prevention of increase in the size of the lens characteristic evaluation device 10, are achieved.

Lens Characteristic Evaluation Device According to the Second Embodiment

Figure 13:
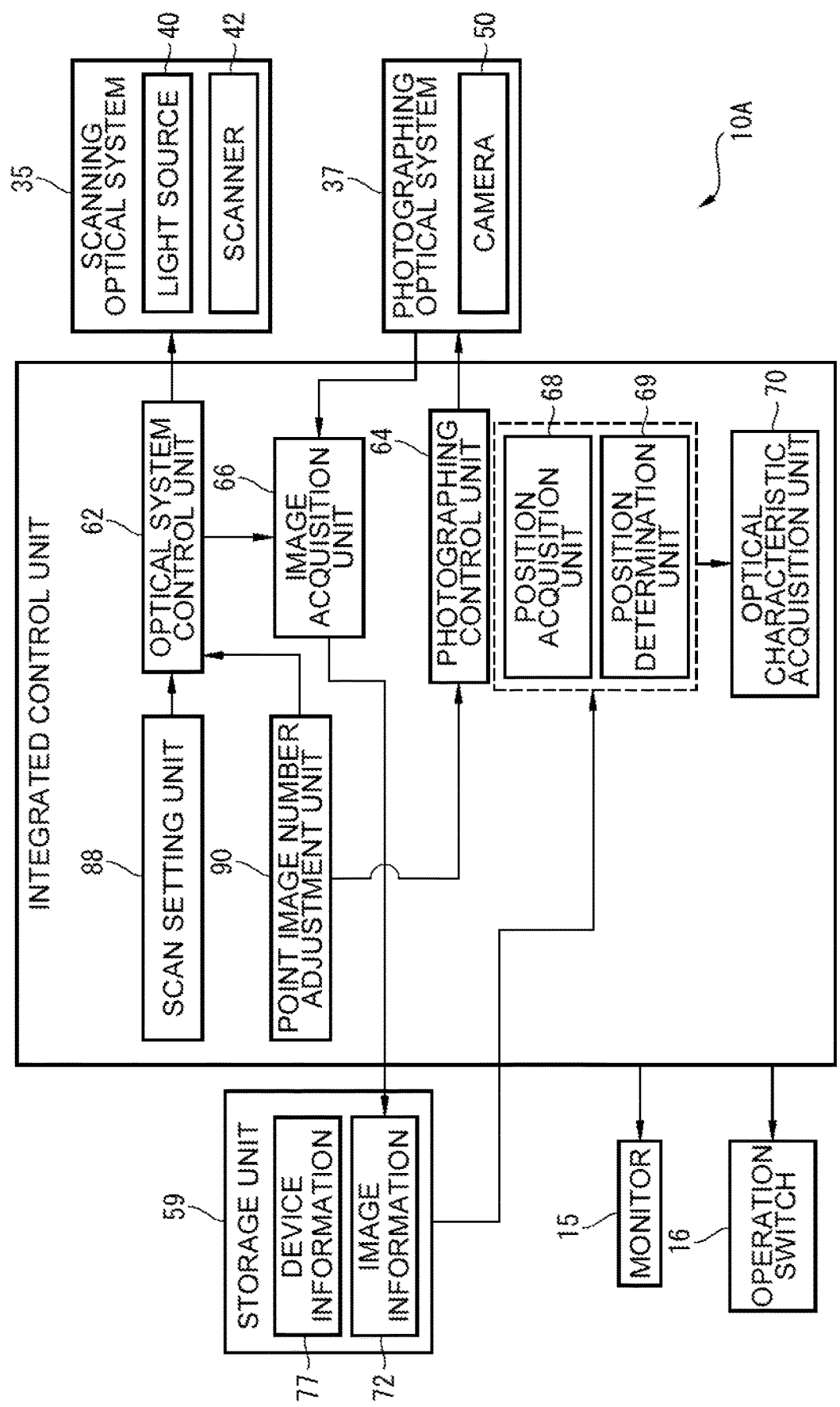
FIG. 13 is a functional block diagram of an integrated control unit of a lens characteristic evaluation device according to a second embodiment.

FIG. 13 is a functional block diagram of an integrated control unit 58 of a lens characteristic evaluation device 10A according to the second embodiment. This lens characteristic evaluation device 10A according to the second embodiment has functions for carrying out setting of the scanning range and the scanning pattern of the linear luminous flux 46, and adjustment of the number of point images formed by the linear luminous flux 46 and included in one frame of the captured image 52.

As illustrated in FIG. 13, the lens characteristic evaluation device 10A according to the second embodiment has basically the same configuration as that of the lens characteristic evaluation device 10 according to the first embodiment, apart from the feature that the integrated control unit 58 functions as a scan setting unit 88 and a point image number adjustment unit 90. As a result, the same reference numerals and/or characters are given to those having the same function or configuration a in the first embodiment, and the description thereof is omitted.

The scan setting unit 88 issues a setting instruction on the scanning range (the measurement range of the spectacle lens 102) and the scanning pattern of the linear luminous flux 46, to the optical system control unit 62 in accordance with the scan setting operation entered by the operation switches 16. Receiving this instruction, the optical system control unit 62 controls the driving of the scanner 42 of the scanning optical system 35 and carries out the setting of the scanning range and the scanning pattern of the linear luminous flux 46.

By allowing the scanning range of the linear luminous flux 46 to be specified (modified), it is made possible to selectively scan only a region in the spectacle lens 102 necessary for the evaluation of the optical characteristic by the linear luminous flux 46. For example, if the spectacle lens 102 is a single focus lens, it is not necessary to scan a wide range of the measurement range (scanning range) with the linear luminous flux 46. Therefore, the scanning range of the linear luminous flux 46 is specified such that the linear luminous flux 46 is emitted for scanning, for example, four pinholes 32A of the center portion in the Hartmann plate 32. In this case, the evaluation (analysis) of the optical characteristic by the lens characteristic evaluation device 10 can be performed with a high speed.

Also, by allowing the scanning pattern of the linear luminous flux 46 to be specified (modified), for example, if the scanning pattern is allowed to be specified (modified) to a ring-like or other particular-shape pattern, evaluation of the frequency distribution of the spectacle lens 102 can be made possible by measuring the shape change of the pattern of the linear luminous flux 46 before and after passing through the spectacle lens 102.

Figure 14:
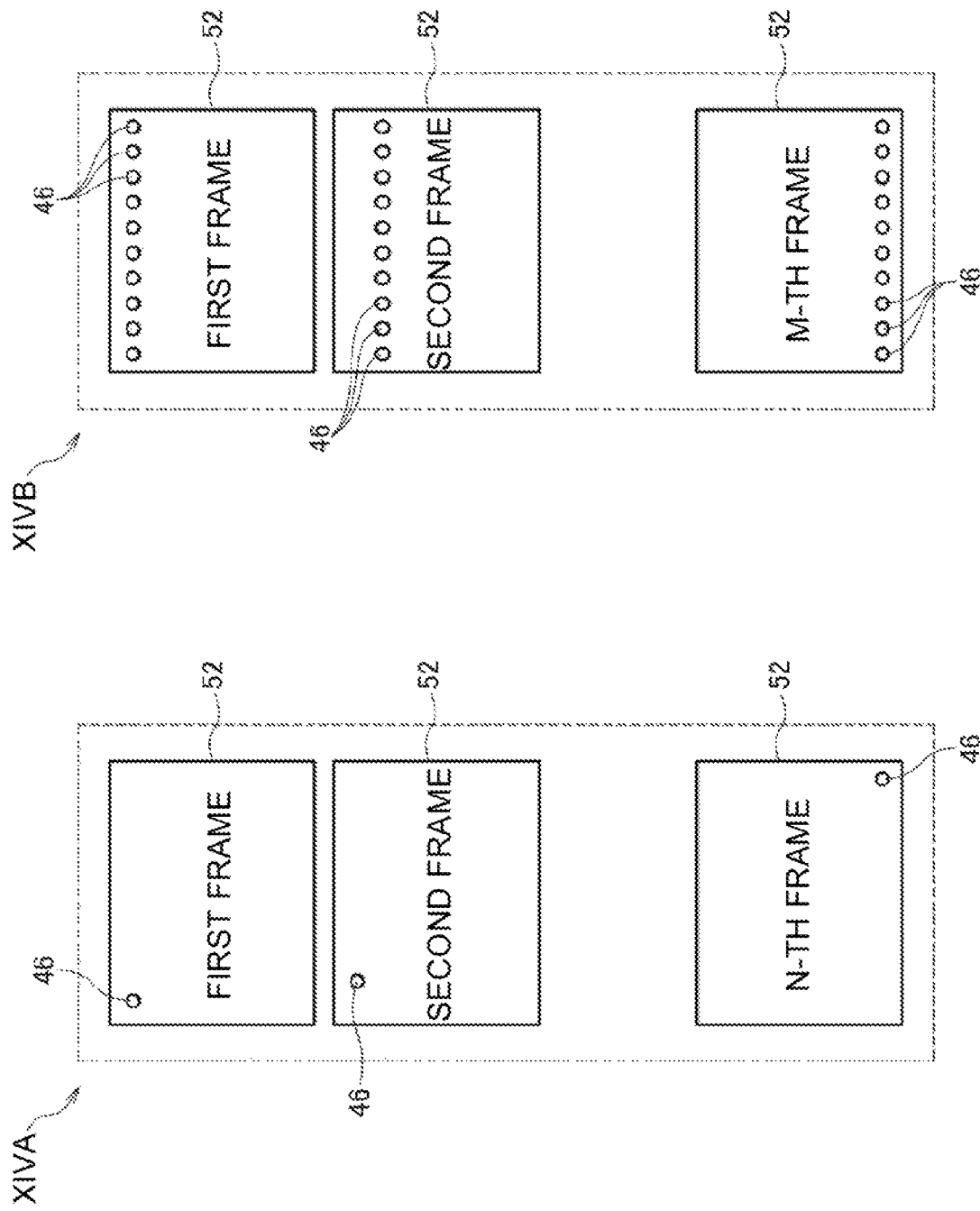
FIG. 14 is an explanatory diagram for explaining adjustment of the number of point images by a linear luminous flux included in a captured image.

FIG. 14 is an explanatory diagram for explaining the adjustment of the number of point images formed by the linear luminous flux 46 and included in the captured image 52. As illustrated in FIG. 13 and FIG. 14, the point image number adjustment unit 90 issues the adjustment instruction to adjust the number of point images to the optical system control unit 62 and the photographing control unit 64 in accordance with the input operation of the number of point images via the operation switches 16.

The optical system control unit 62, which has received the adjustment instruction to adjust the number of point images, adjusts the scanning speed of the scanner 42 of the scanning optical system 35. For example, if the number of point images included in the captured image 52 for one frame is to be increased, the scanning speed of the scanner 42 is increased. If the number of point images is to be decreased, the scanning speed of the scanner 42 is decreased.

Also, the photographing control unit 64, which has received the adjustment instruction to adjust the number of point images, controls the driving of the imaging element 50B of the camera 50 and adjusts the exposure time (shutter speed) of the imaging element 50B. For example, the exposure time of the imaging element 50B is adjusted on the basis of the scanning speed of the scanner 42 such that the captured image 52 for one frame includes the same number of the point images formed by the linear luminous flux 46, as the number specified by the adjustment instruction. Note that the exposure time of the imaging element 50B may be fixed (without performing the control of the imaging element 50B) and only the scanning speed of the scanner 42 may be adjusted.

By controlling the scanner 42 and the imaging element 50B in this manner, as illustrated in a part indicated by the reference sign XIVA of FIG. 14, the number of point images included in the captured image 52 for one flame can be adjusted such that only one point image is included therein and, alternatively, as illustrated in a part indicated by the reference sign XIVB of FIG. 14, the number of the point images included in the captured image 52 for one frame can be adjusted such that a plurality of point images are included therein. In particular, the optical characteristic evaluation of the spectacle lens 102 can be completed in a shorter time when the scanning speed of the scanner 42 is made fluster and the number of point images included in the captured image 52 for one frame is made larger. For example, scanning of the front surface of the spectacle lens 102 with the linear luminous flux 46 may be completed while the captured image 52 for one frame is being photographed by the camera 50.

Note that if the number of point images included in the captured image 52 for one frame is increased, as illustrated in the parts indicated by the reference signs 7B and 7C in FIG. 7, there is a risk that, depending on the types of the spectacle lens 102 (e.g., a strong plus power convex lens), the point images formed by the linear luminous flux 46 and projected on the screen 36 may be overlapped with each other or the positional relationship thereof may be inverted. In this case, the number of the point images included in the captured image 52 is decreased (for example, decreased to one) by operating point image number adjustment unit 90 to lower the scanning speed of the scanner 42.

Third Embodiment

Figure 15:
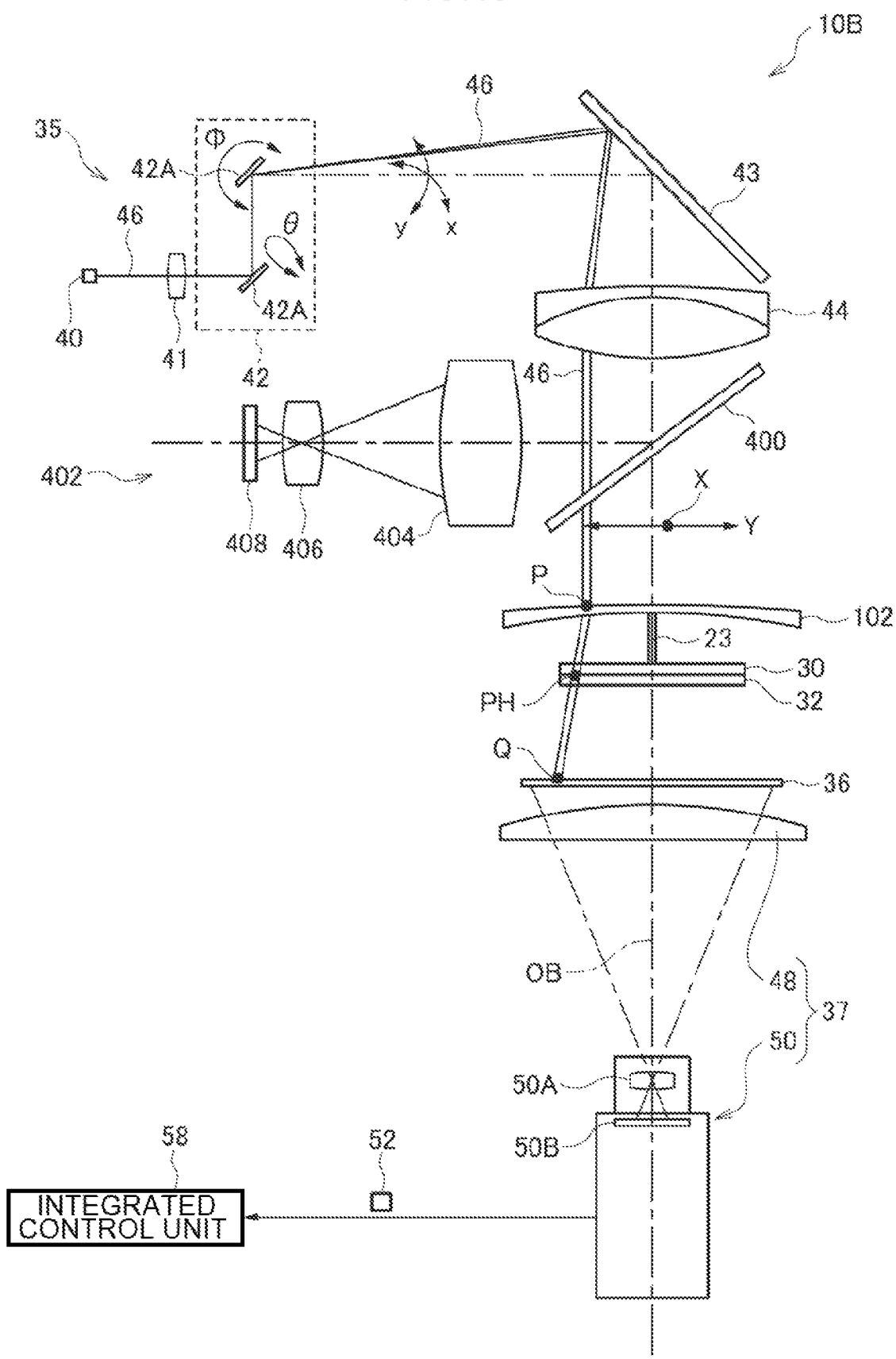
FIG. 15 is a schematic diagram of scanning optical system, screen, and photographing optical system of a lens characteristic evaluation device according to a third embodiment.

Next, explanations will be provided herein on the lens characteristic evaluation device 10B according to the third embodiment (see FIG. 15). The scanner 42 in the above-described embodiments adjusts the scan angle of the linear luminous flux 46 by adjusting the swing angles θ, φ of the respective Galvano mirrors 42A such that linear luminous flux 46 is emitted for scanning in the two-dimensional directions. Note that the scan angle of the linear luminous flux 46 (which may also be referred to as an emission angle) is an angle of the linear luminous flux 46 emitted from the scanner 42, for example, if the respective. Galvano mirrors 42A are disposed at the swing center positions, i.e., an angle with reference to the reference direction that is parallel to the linear luminous flux 46 at the scanning center position of the scanner 42 (indicated by the dash-dotted line in FIG. 15) (the angle in the xy directions in FIG. 15).

In the course of this, in a certain type of the scanner 42, for example, in a Galvano scanner and an MEMS scanner (2-axis MEMS mirror), in particular in the MEMS scanner, there is a problem that the reproducibility of the swing angles θ, φ of the mirror is low. Here, the low reproducibility refers to the fact that deviation may occur between the instruction values (which may also be referred to as control value, specified value, or target value) of the swing angles θ, φ of the mirrors by the optical system control unit 62 and the actual swing angles θ, φ of the mirrors.

When the reproducibility of the swing angles θ, φ of the mirrors is lowered in this fashion, regardless of the fact that the instruction values of the swing angles θ, φ of the mirrors remain the same, deviation may occur in the actual swing angles θ, φ of the mirrors. In response to the deviation in the actual swing angles θ, φ, deviation may also occur in the scan angle of the linear luminous flux 46 emitted from the scanner 42. In this case, since the respective scanning positions P each vary, the positions (luminous flux profile) of the pinholes 32A in the Hartmann plate 32 through which the linear luminous flux 46 passes will also vary. This causes the problem that the evaluation accuracy of the optical characteristic of the spectacle lens 102 by the optical characteristic acquisition unit 70 may be decreased or the reproducibility of the mapping image (SCA mapping image) of the optical characteristic of the spectacle lens 102 acquired by the optical characteristic acquisition unit 70 is decreased. Note that "S" in "SCA" stands for spherical power (spherical), "C" stands for astigmatic power (cylinder), and "A" is an astigmatic axis (axis).

Also, when the accuracy of the surface (lens surface) of the spectacle lens 102 and the dusts or scratches on this surface are taken into account, it is preferable that the reproducibility of the swing angles θ, φ of the mirrors, i.e., the reproducibility of the scan angle of the linear luminous flux 46 emitted from the scanner 42 is high.

In view of this, the lens characteristic evaluation device 10B according to the third embodiment (see FIG. 15) corrects the control of the swing angles θ, φ of the respective. Galvano mirrors 42A by the optical system control unit 62 (which corresponds to the "control of the scan angle" according to the present invention).

FIG. 15 is a schematic diagram of the scanning optical system 35, the screen 36, and the photographing optical system 37 of the lens characteristic evaluation device 10B according to the third embodiment. As illustrated in FIG. 15, the lens characteristic evaluation device 10B has basically the same configuration as that of the lens characteristic evaluation device 10 according to the first embodiment, apart from the fact that the lens characteristic evaluation device 10B includes a half mirror 400 and a light receiving optical system 402. Therefore, the same reference numerals and/or characters are given to those having the same function or configuration as in the first embodiment, and the description thereof is omitted.

The half mirror 400, which corresponds to the "light splitting unit" of the present invention, is provided between the collimator 44 and the front surface of the spectacle lens 102 set on the setting unit 20. This half mirror 400 is configured to reflect a part of the linear luminous flux 46 emitted from the collimator 44 toward the light receiving optical system 402 which will be described later, and let the reminder of the linear luminous flux 46 pass therethrough on an as-is basis so as to emit it toward the spectacle lens 102.

The light receiving optical system 402 includes a lens 404, a lens 406, and a CCD type (which may also be a CMOS type) imaging element 408. The lenses 404, 406 are configured to cause the linear luminous flux 46 reflected by the half mirror 400 to enter the light receiving surface of the imaging element 408.

The imaging element 408 has a light receiving surface that receives the linear luminous flux 46 incident from the half mirror 400 via the lenses 404, 406. In addition, the imaging element 408 is configured to receive (image) the linear luminous flux 46 on the light receiving surface and output a light receiving signal to the integrated control unit 58. This light receiving signal indicates the light receiving position (the position coordinates of the pixels in the light receiving surface) of the linear luminous flux 46 on the light receiving surface of the imaging element 408.

Here, the light receiving position of the linear luminous flux 46 received on the light receiving surface of the imaging element 408 varies depending on the swing angles θ, φ of the respective Galvano mirrors 42A, i.e., the scan angles (θ, φ) of the linear luminous fluxes 46 emitted from the scanner 42. As a result, a one-to-one relationship holds between the light receiving position of the linear luminous flux 46 on the light receiving surface and the swing angles θ, φ of the respective Galvano mirrors 42A (the scan angle of the linear luminous flux 46). Accordingly, the actual swing angles θ, φ of the respective Galvano mirrors 42A can be obtained from the light receiving position of the linear luminous flux 46 on the light receiving surface.

Figure 16:
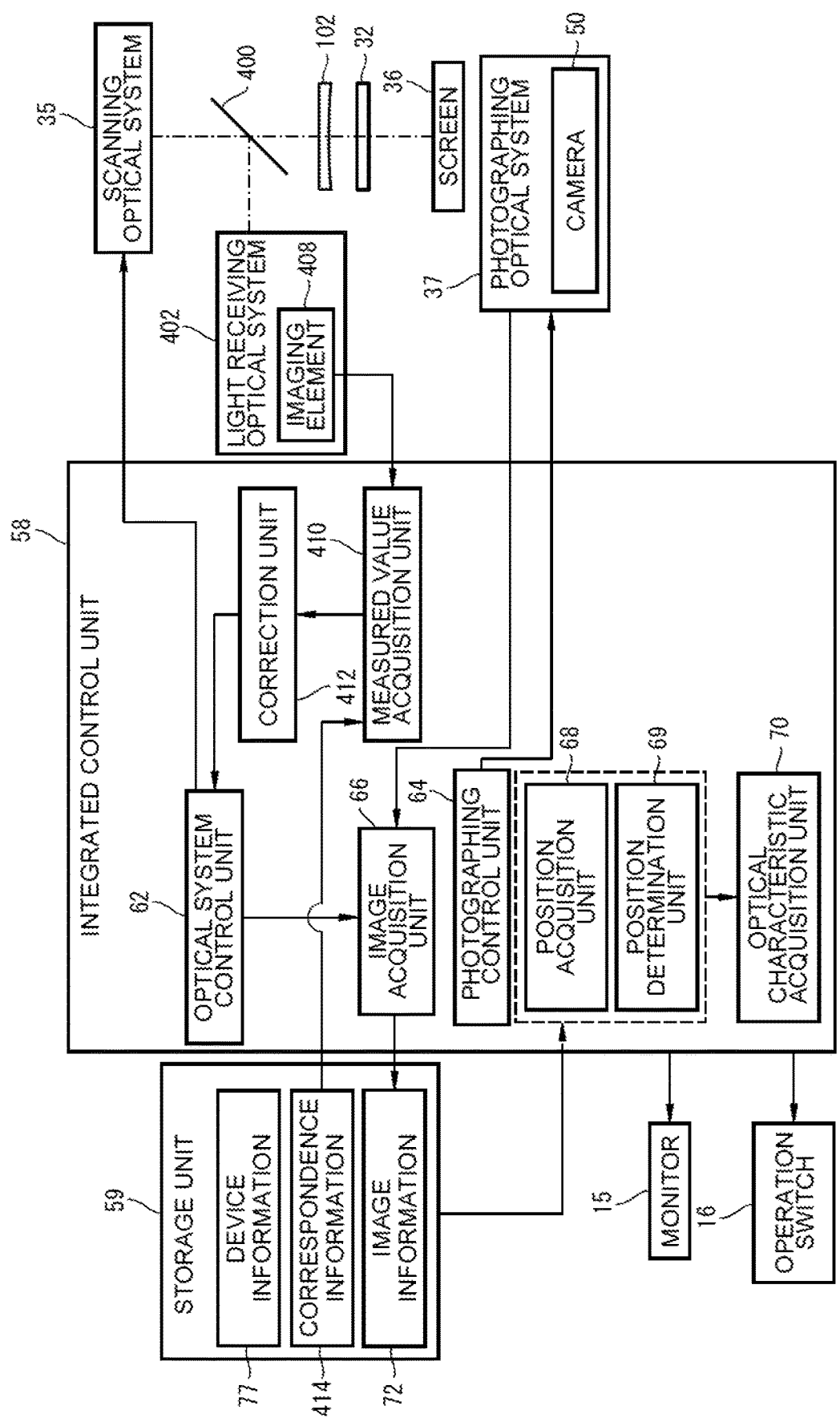
FIG. 16 is a functional block diagram of an integrated control unit of a lens characteristic evaluation device according to the third embodiment.

FIG. 16 is a functional block diagram of the integrated control unit 58 of the lens characteristic evaluation device 10B according to the third embodiment. As illustrated in FIG. 16, the integrated control unit 58 according to the third embodiment is basically the same as the integrated control unit 58 of the first embodiment, apart from the fact that the integrated control unit 58 functions as the measured value acquisition unit 410 and the correction unit 412, as well as the unit 58 functions as the aforementioned respective units.

The measured value acquisition unit 410 acquires the measured values of the actual swing angles θ, φ of the respective Galvano mirrors 42A (which may also be referred to as actual measured value) on the basis of the light receiving signal that has been input from the imaging element 408 and the correspondence information 414 that has been acquired from the storage unit 59. The correspondence information 414 is a piece of information indicating a correspondence relationship between the light receiving position of the linear luminous flux 46 on the light receiving surface and the swing angles θ, φ of the respective Galvano mirrors 42A. The correspondence information 41 is created by carrying out experiments or simulations in advance. By virtue of this, the measured value acquisition unit 410 determines the light receiving position of the linear luminous flux 46 on the light receiving surface on the basis of the light receiving signal from the imaging element 408. Further, the measured value acquisition unit 410 refers to the correspondence information 414 on the basis of this light receiving position, and thereby acquires the measured values of the swing angles θ, φ of the respective Galvano mirrors 42A.

The measured values of the swing angles θ, φ of the respective Galvano mirrors 42A correspond to the measured values of the scan angles of the present invention. In addition, the measured value acquisition unit 410 is configured to output the information regarding the measured values of the swing angles θ, φ of the respective Galvano mirrors 42A to the correction unit 412.

The correction unit 412 corrects the control of the swing angles θ, φ of the respective Galvano mirrors 42A by the optical system control unit 62. The correction unit 412 acquires the measured values of the swing angles θ, φ of the respective Galvano mirrors 42A from the measured value acquisition unit 410 and acquires the specified values of the swing angles θ, φ of the respective Galvano mirrors 42A from the optical system control unit 62. This specified values correspond to the specified value of the scan angle of the present invention.

Subsequently, the correction unit 412 corrects the control of the swing angles θ, φ by optical system control unit 62 on the basis of the result of comparison between the measured values of the swing angles θ, φ of the respective Galvano mirrors 42A and the specified values such that the measured values of the respective swing angles θ, φ match the specified values. By virtue of this, the correction unit 412 can correct the control of the scan angle of the linear luminous flux 46 by the optical system control unit 62.

Figure 17:
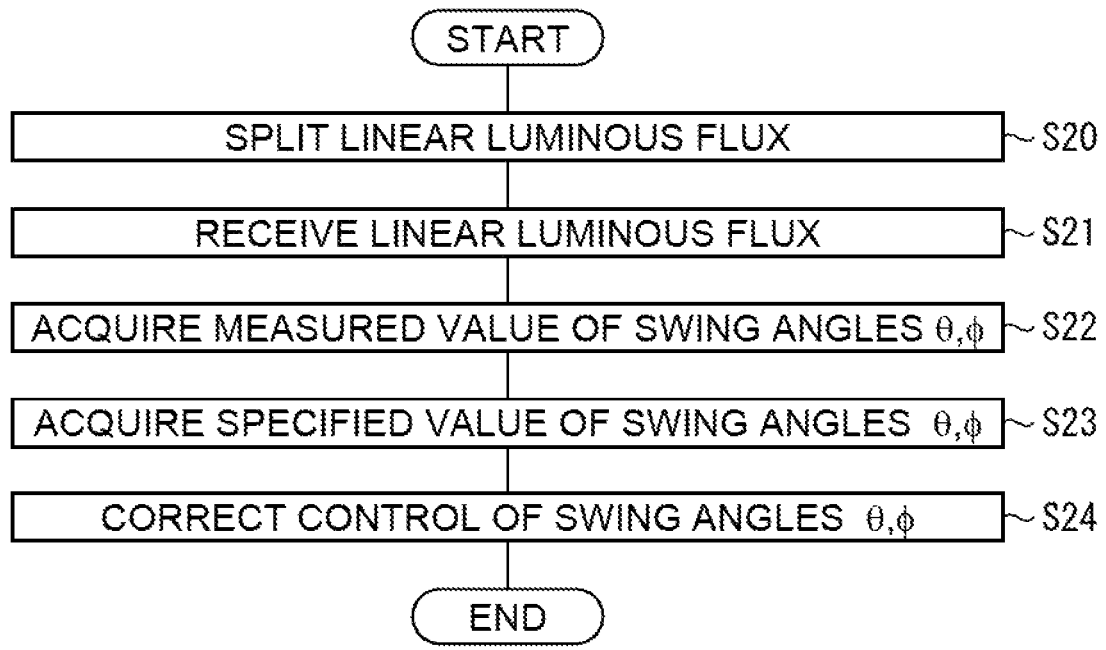
FIG. 17 is a flowchart illustrating the flow of correction control of a swing angle of each Galvano mirror by the lens characteristic evaluation device according to the third embodiment.

FIG. 17 is a flowchart that illustrates a flow of the correction control of the swing angles θ, φ of the respective Galvano mirrors 42A by the lens characteristic evaluation device 10B according to the third embodiment. As illustrated in FIG. 17, in the steps S2, S3 which has already been illustrated in the FIG. 12, when the optical system control unit 62 controls the scanning optical system 35 and emits the linear luminous flux 46 from the scanner 42, the linear luminous flux 46 enters the half mirror 400 via the mirror 43 and the collimator 44. In addition, a part of the linear luminous flux 46 is split therefrom by the half mirror 400 and the split part is reflected toward the light receiving optical system 402 (step S20, which corresponds to the "light splitting step" according to the present invention).

The linear luminous flux 46 reflected by the half mirror 400 is received on the light receiving surface of the imaging, element 40S in the light receiving optical system 402 (step S21, which corresponds to the "light receiving step" according to the present invention). By virtue of this, a light receiving signal is output from the imaging element 408 to the measured value acquisition unit 410.

The measured value acquisition unit 410 refers to the correspondence information 414 that has been read from the storage unit 59 on the basis of the light receiving position of the linear luminous flux 46 on the light receiving surface indicated by the light receiving signal that has been input from the imaging element 408 and acquires the measured values of the swing angles θ, φ of the respective Galvano mirrors 42A (step S22, which corresponds to the "measured value acquisition step" according to the present invention). In addition, the measured value acquisition unit 410 outputs the measured values of the swing angles θ, φ of the respective Galvano mirrors 42A to the connection unit 412.

The correction unit 412 acquires the measured values of the swing angles θ, φ of the respective Galvano mirrors 42A from the measured value acquisition unit 410. Also, the correction unit 412 acquires the specified values of the swing angles θ, φ of the respective Galvano mirrors 42A from the optical system control unit 62 (step S23). Note that the timing of acquisition of the specified values is not limited to a timing after the step S22, and may be a timing before the step S22.

In addition, the control of the swing angles θ, φ by optical system control unit 62 is corrected on the basis of the result of comparison between the measured values of the swing, angles θ, φ of the respective Galvano mirrors 42A and the specified values (step S24, which corresponds to the "correction step" according to the present invention). By virtue of this, the actual swing angles θ, φ (scan angle of the linear luminous flux 46) of the respective Galvano mirrors 42A match the specified values.

In this manner, in the lens characteristic evaluation device 10B according to the third embodiment, the errors in the measured values relative to the specified values of the swing angles θ, φ of the respective Galvano mirrors 42A (scan angle of the linear luminous flux 46) can be reduced by correcting the control of the swing angles θ, φ of the respective Galvano mirrors 42A by the optical system control unit 62. By virtue of this, the deviation of the swing angles θ, φ of the respective Galvano mirrors 42A relative to the instruction values, i.e., deviation of the scan angle of the linear luminous flux 46 emitted from the scanner 42 is reduced. As a result of this, because deviation in the respective scanning position P is suppressed, evaluation accuracy of the optical characteristic of the spectacle lens 102 by the optical characteristic acquisition unit 70 and reproducibility of the mapping image of the optical characteristics are improved.

In the third embodiment, the half mirror 400 is arranged between the collimator 44 and the front surface of the spectacle lens 102 set on the setting unit 20. However, the half mirror 400 may be arranged, for example, between the scanner 42 and the mirror 43 or may be arranged between the mirror 43 and the collimator 14. Also, the mirror 43 may be replaced by the half mirror 400. Specifically, the arrangement position of the half mirror 400 is not particularly limited as long as it is a position on the optical path of the linear luminous flux 46 extending from the scanner 42 to the front surface of the spectacle lens 102.

In the third embodiment, an example is explained where the functions for correcting the control of the swing angles θ, φ of the respective Galvano mirrors 42A are added to the lens characteristic evaluation device 10 according to the first embodiment. However, the same or similar functions may be added to the lens characteristic evaluation device 10A according to the second embodiment.

Fourth Embodiment

Figure 18:
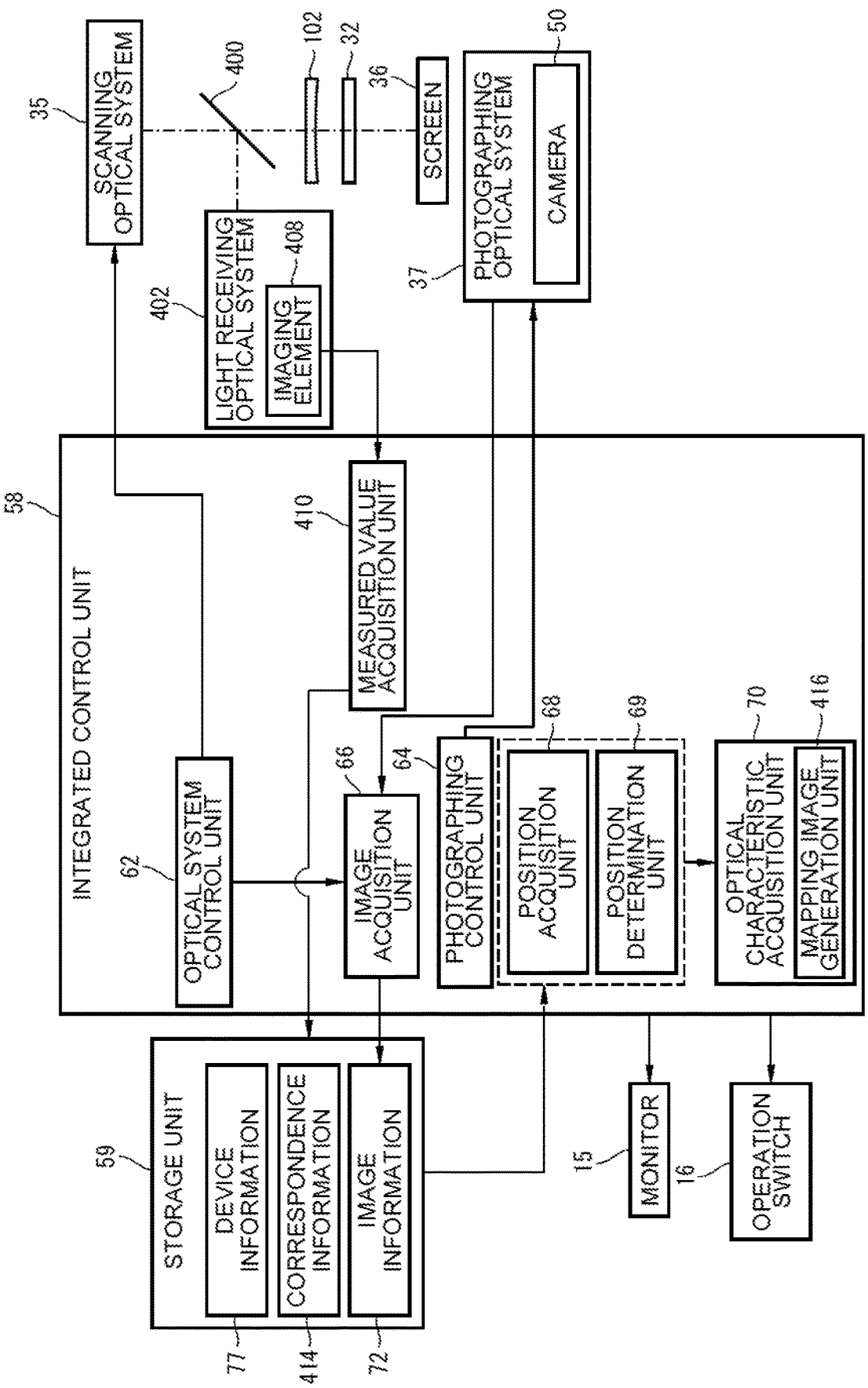
FIG. 18 is a functional block diagram of a lens characteristic evaluation device according to a fourth embodiment.

FIG. 18 is a functional block diagram of the lens characteristic evaluation device 10C according to the fourth embodiment. In this lens characteristic evaluation device 10C according to the fourth embodiment, the optical characteristic (mapping image) of the spectacle lens 102 is obtained using the measured values of the swing angles θ, φ of the respective Galvano mirrors 42A acquired by the measured value acquisition unit 410 explained in the third embodiment.

As illustrated in FIG. 18, the lens characteristic evaluation device 10C according to the fourth embodiment has basically the same configuration as that of the lens characteristic evaluation device 10B according to the third embodiment, apart from the fact that the integrated control unit 58 does not function as the correction unit 412 of the third embodiment (see FIG. 16) and the optical characteristic acquisition unit 70 functions as the mapping image generation unit 416. Therefore, the same reference numerals and/or characters are given to those having the same function or configuration as in the above respective embodiments, and the description thereof is omitted.

The measured value acquisition unit 410 according to the fourth embodiment acquires, in the same or similar manner as in the third embodiment, the measured values of the swing angles θ, φ of the respective Galvano mirrors 42A, i.e., the measured value of the scan angle of the linear luminous flux 46. In addition, the measured value acquisition unit 410 stores the measured values of the swing angles θ, φ of the respective Galvano mirrors 42A (scan angle of the linear luminous flux 46) in the image information 72 in the storage unit 59.

Figure 19:
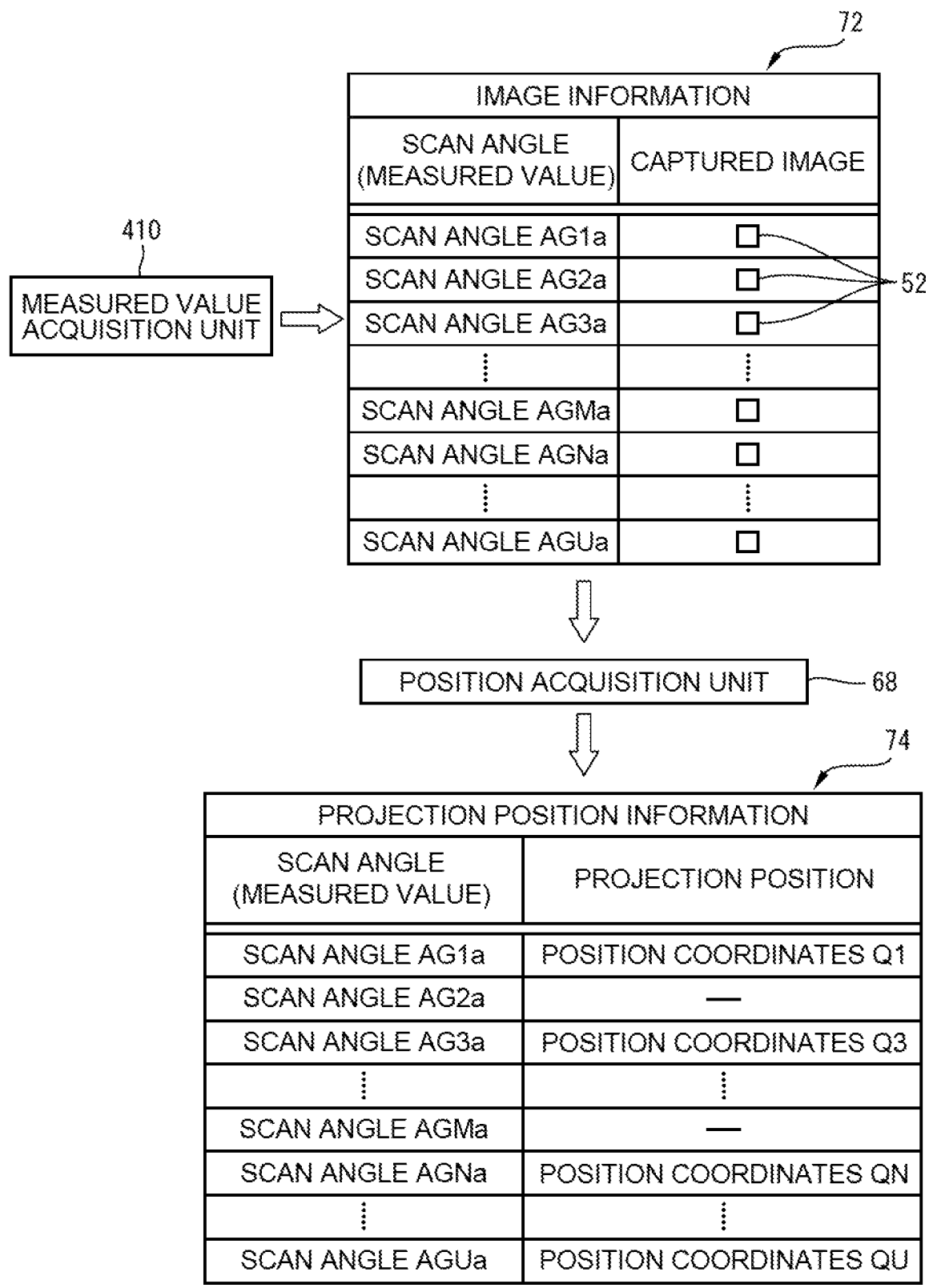
FIG. 19 is an explanatory diagram of image information and photographing position information according to the fourth embodiment.
Figure 20:
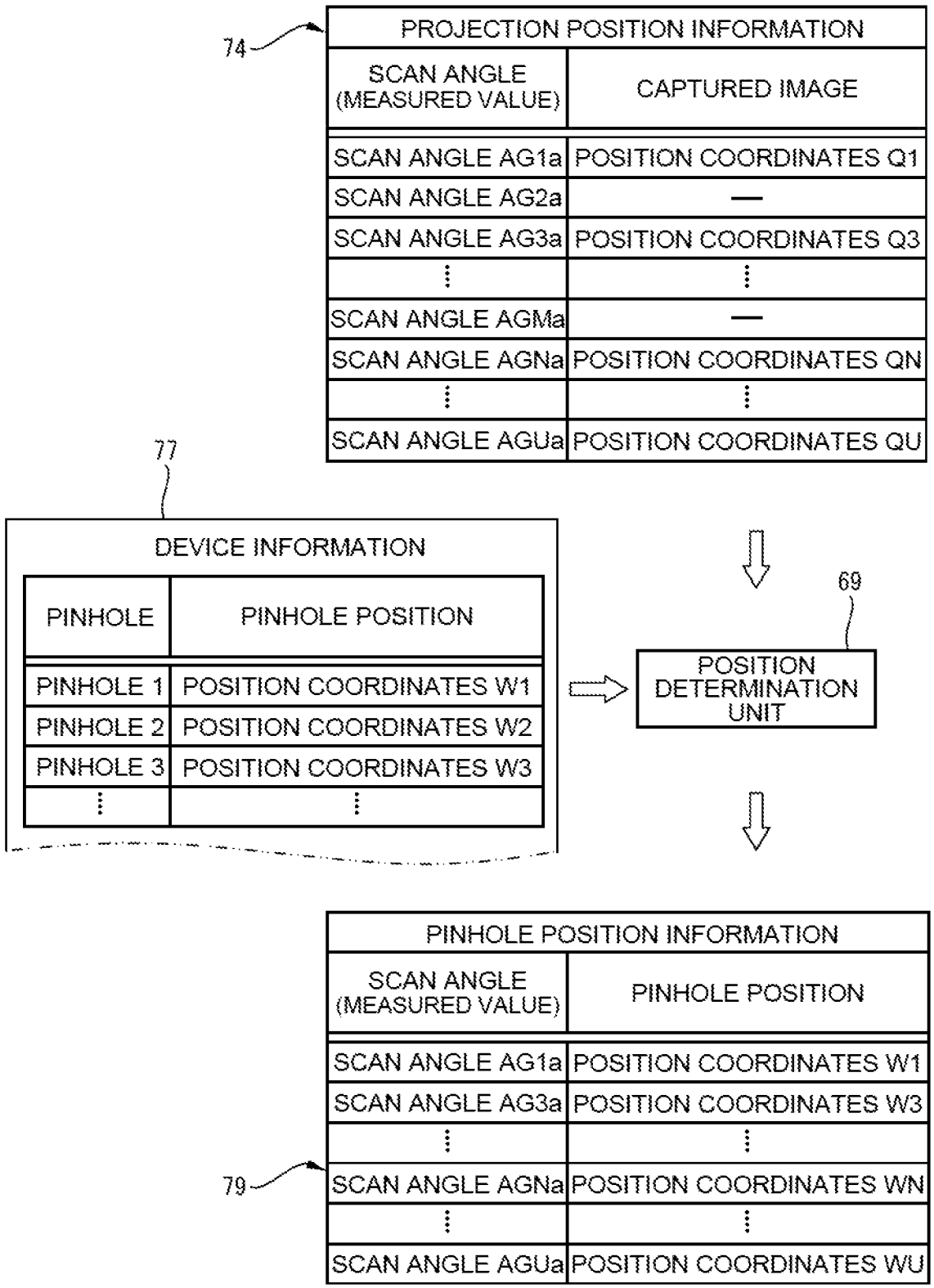
FIG. 20 is an explanatory diagram for explaining determination processing by a position determination unit according to the fourth embodiment to determine a pinhole and its position.

FIG. 19 is an explanatory diagram of the image information 72 and the projection position information 74 according to the fourth embodiment. FIG. 20 is an explanatory diagram for explaining the determination processing to determine the pinholes 32A and its pinhole positions W by the position determination unit 69 according to the fourth embodiment.

As illustrated in FIG. 19, the respective captured images 52 continuously input from the image acquisition unit 66 are stored in the image information 72 according to the fourth embodiment in a state where the captured images 52 are associated with the measured values of the scan angles of the linear luminous flux 46 input respectively and correspondingly to the captured images 52 from the measured value acquisition unit 410.

The position acquisition unit 68 according to the fourth embodiment generates, as explained in the first embodiment (see FIG. 9), the projection position information 74 on the basis of the image information 72. In the projection position information 74 according to the fourth embodiment, the position coordinates of the projection position Q of the linear luminous flux 46 projected on the screen 36 and the measured values of the scan angles of the linear luminous flux 46 corresponding to the individual position coordinates are stored in a state where they are association with each other.

As illustrated in FIG. 20, the position determination unit 69 according to the fourth embodiment determines, as explained in the first embodiment (see FIG. 10), the pinhole 32A of the Hartmann plate 32 through which the linear luminous flux 46 projected on the screen 36 has passed and its pinhole position W on the basis of the projection position information 74 and the device information 77.

Specifically, the position determination unit 69 obtains the measured values of the scanning positions P of the respective linear luminous fluxes 46 on the basis of the measured values of the scan angles of the respective linear luminous fluxes 46 (the swing angles θ, φ of the respective Galvano mirrors 42A) stored in the projection position information 74. By virtue of this, the position determination unit 69 can accurately obtain the scanning positions P of the respective linear luminous fluxes 46 respectively corresponding to the position coordinates of the respective projection positions Q even in a case where the reproducibility of the swing angles θ, φ of the respective Galvano mirrors 42A is low. As a result of this, the position determination unit 69 can analyze the scanning position P and the projection position Q corresponding to the center portion of the spectacle lens 102 with higher accuracy than in the first embodiment. Therefore, it is made possible to determine the scanning position P and the pinhole 32A through which the linear luminous flux 46 passing the projection position Q has passed, with accuracy higher than in the first embodiment.

Thereafter, in the same or similar manner as in the first embodiment, the position determination unit 69 uses the pinhole position W of the pinhole 32A that has been determined first as the reference, and determines the pinholes 32A through which the linear luminous faxes 46 passing through portions other than the optical center portion of the spectacle lens 102 have passed on the basis of the measured values of the scan angles (scanning position P) of the respective linear luminous fluxes 46, the respective projection positions Q, and the device information 77. As a result of this, in the fourth embodiment, the pinhole 32A through which the linear luminous flux 46 projected on the screen 36 has passed and its pinhole position W can be determined with an accuracy higher than that of the first embodiment. In addition, the position determination unit 69 outputs, to the optical characteristic acquisition unit 70, the pinhole position information 79 indicating the correspondence relationship between the measured values of the scan angles of the respective linear luminous fluxes 46 and the pinhole positions W respectively corresponding to the respective linear luminous fluxes 46.

Referring again to FIG. 18, the optical characteristic acquisition unit 70 according to the fourth embodiment acquires the optical center position (optical axis OA) and the optical characteristic of the spectacle lens 102, in the same or similar manner as in the first embodiment (see FIG. 11), on the basis of the projection position information 74 input from the position acquisition unit 68, the pinhole position information 79 input from the position determination unit 69, and the device information 77 in the storage unit 59. Note that these optical characteristics include, in addition to the back focus Bf explained in the first embodiment, the spherical power of the respective sections of the spectacle lens 102, cylindrical power (astigmatic power), cylindrical axis angle (astigmatic axis angle), prism value (prism power and prism base direction), and the like.

The mapping image generation unit 416 generates a mapping image indicating the distribution of the optical characteristics of the spectacle lens 102 on the basis of the optical characteristic of the spectacle lens 102 acquired by the optical characteristic acquisition unit 70 and the measured value of the scan angles (scanning positions P) of the respective linear luminous fluxes 46 acquired from projection position information 74 or the pinhole position information 79, etc., using a known scheme. In addition, the mapping image generation unit 416 outputs the mapping image to the storage unit 59 and the monitor 15.

Figure 21:
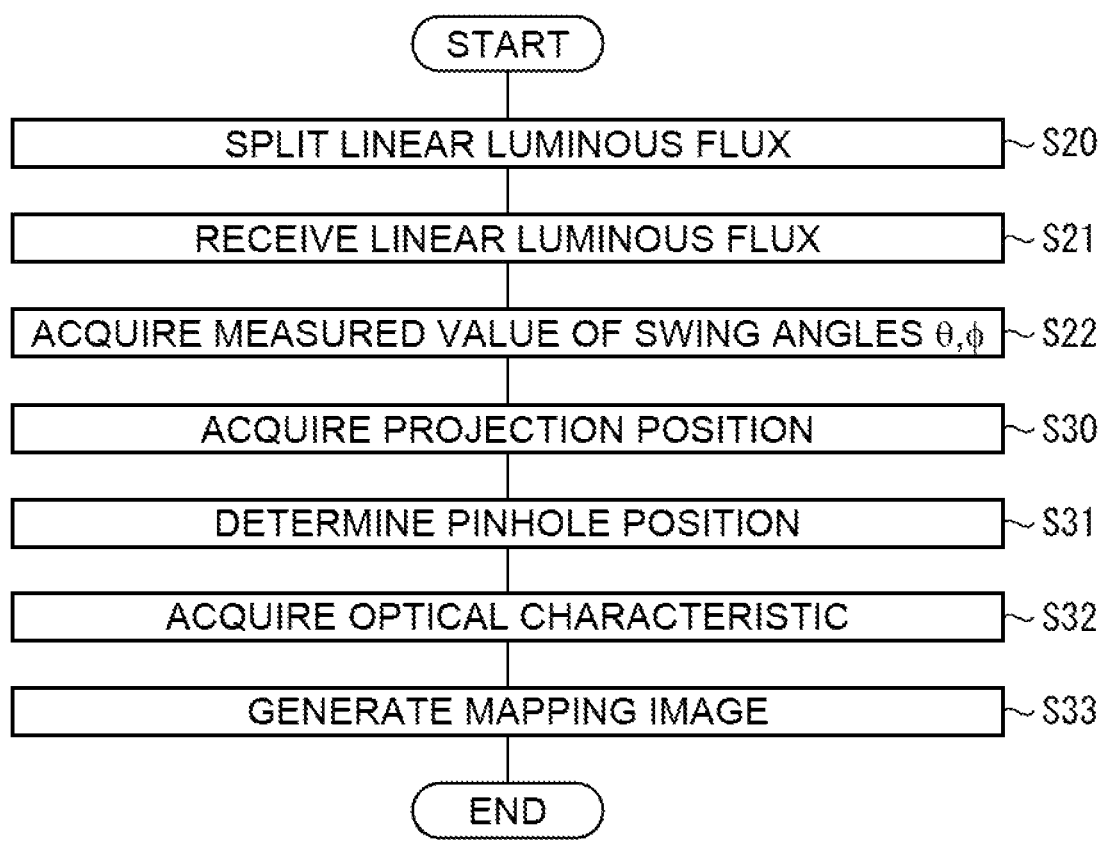
FIG. 21 is a flowchart illustrating the flow of generation of a mapping image by the lens characteristic evaluation device according to the fourth embodiment.

FIG. 21 is a flowchart that illustrates a flow of generation of the mapping image by the lens characteristic evaluation device 10C of the fourth embodiment. As illustrated in FIG. 21, since the processing from the step S20 to the step S22 is identical with that according to the third embodiment illustrated in FIG. 17, explanation thereof will be omitted. Note that the step S20 corresponds to the "light splitting step" of the present invention, the step S21 corresponds to the "light receiving step" of the present invention, and the step S22 corresponds to the "measured value acquisition step" of the present invention.

When the step S22 is completed, the measured value acquisition unit 410 stores, as illustrated in FIG. 19, the measured values of the swing angles θ, φ of the respective Galvano mirrors 42A (the scan angles of the respective linear luminous fluxes 46) in the image information 72 in the storage unit 59. By virtue of this, in image information 72, the respective captured images 52 are associated with the measured values of the scan angles of the linear luminous fluxes 46 to which the respective captured image 52 correspond respectively.

Subsequently, the position acquisition unit 68 generates the projection position information 74 illustrated in FIG. 19 on the basis of the image information 72 in the storage unit 59, and outputs this projection position information 74 to the position determination unit 69 (step S30, which corresponds to the "position acquisition step" according to the present invention).

The position determination unit 69 which has received the input of the projection position information 74, first obtains, on the basis of the projection position information 74, the measured values of the scanning positions P respectively corresponding to the measured values of the scan angles of the respective linear luminous fluxes 46. Subsequently, on the basis of the measured values of the respective scanning positions P and the position coordinates of the projection position Q of the linear luminous flux 46 projected on the screen 36, the position determination unit 69 analyzes the scanning position P and the projection position Q respectively corresponding to the center portion of the spectacle lens 102, and determines the pinhole 32A through which the linear luminous flux 46 corresponding to these scanning position P and projection position Q has passed.

In addition, the position determination unit 69 determines the pinhole positions W of the pinholes 32A through which the remaining linear luminous fluxes 46 have passed using the pinhole position W of the pinhole 32A that has been determined first as the reference, on the basis of the measured values of the scan angles of the respective linear luminous fluxes 46, the respective projection positions Q, and the device information 77.

In this manner, the position determination unit 69 can determine the pinholes 32A through which the respective linear luminous fluxes 46 have passed and their pinhole positions W with a high accuracy from the measured values of the respective scanning positions P and the like even in a case where the reproducibility of the swing angles θ, φ of the respective Galvano mirrors 42A is low (step S31, which corresponds to the "position determination step" according to the present invention). In addition, the position determination unit 69 outputs the pinhole position information 79 illustrated in FIG. 20 to the optical characteristic acquisition unit 70.

The position determination unit 69 which has received the input of the pinhole position information 79 acquires the optical center position and the optical characteristic of the spectacle lens 102 on the basis of this pinhole position information 79, the projection position information 74, and the device information 77 (step S32, which corresponds to the "optical characteristic acquisition step" according to the present invention).

Subsequently, the mapping image generation unit 416 generates a mapping image of the spectacle lens 102 on the basis of the optical characteristic of the spectacle lens 102 acquired by the optical characteristic acquisition unit 70 and the measured values of the scan angles (scanning positions P) of the respective linear luminous fluxes 46 acquired from the projection position information 74, etc. and outputs this mapping image to the monitor 15 or the like (step S33).

As has been described above, in the fourth embodiment, evaluation of the optical characteristic of the spectacle lens 102 and the mapping image can be performed using the measured values of the scan angles of the respective linear luminous fluxes 46 (the swing angles θ, φ of the respective Galvano mirrors 42A). As a result of this, even in a case where the reproducibility of the swing angles θ, φ of the respective Galvano mirrors 42A is low, deviation of the swing angles θ, φ is prevented from affecting the evaluation result of the optical characteristic of the spectacle lens 102 and the mapping image. By virtue of this, the evaluation accuracy of the optical characteristic of the spectacle lens 102 and the reproducibility of the mapping image for the same spectacle lens 102 can be improved.

<Others>

In the above-described respective embodiments, while the front surface of the spectacle lens 102 is scanned with the linear luminous flux 46, the light quantity of this linear luminous flux 46 is kept constant. However, for example, the light quantity (luminance) of the linear luminous flux 46 emitted from the light source 40 may be adjusted in accordance with the scan angle of the linear luminous flux 46. Specifically, the light quantity of the linear luminous flux 46 is adjusted such that the light quantity of the linear luminous flux 46 radiated on the center portion of the spectacle lens 102 is low and the light quantity of the linear luminous flux 46 radiated on a peripheral portion of the spectacle lens 102 is high. By virtue of this, the brightness of the linear luminous flux 46 at the center portion and the peripheral portion of the captured image 52 can be adjusted to be uniform.

In the above-described respective embodiments, the photographing conditions of the camera 50 are fixed while the front surface of the spectacle lens 102 is scanned with the linear luminous flux 46. However, the photographing conditions of the camera 50 may be changed, for example, between a case where the linear luminous flux 46 is scanning the center portion of the spectacle lens 102 and a case where the linear luminous flux 46 is scanning the peripheral portion of the spectacle lens 102. These photographing conditions are, for example, an exposure (accumulation) time, a gain, and the like of the imaging element 50B of the camera 50.

In the lens characteristic evaluation device 10 or the like of the above-described respective embodiments, when only the prism amount of the spectacle lens 102 is measured, the spectacle lens 102 may be irradiated only with the linear luminous flux 46 along the photographing optical axis OB without performing scanning of the linear luminous flux 46 by the scanner 42.

In the above-described respective embodiments, the explanations have been provided based on the examples of the lens characteristic evaluation device 10 or the like that evaluates the optical characteristic of the left and right spectacle lenses 102 of the spectacle flame 101 without replacement of the spectacle frame 101. However, the present invention can be implemented on a various types of lens characteristic evaluation devices that evaluates the test lens, for example, such as a lens characteristic evaluation device (lens meter) that evaluates the optical characteristics of the left and right spectacle lenses 102 one by one (one at a time), a lens characteristic evaluation device (lens meter), that evaluates optical characteristic of an unprocessed lens and the like. Also, the present invention can be implemented on a lens characteristic evaluation device that evaluates optical characteristics of test lenses for various purposes other than eyeglasses.

What is claimed is:

1. A lens characteristic evaluation device comprising:
   a scanning optical system including a scanner configured to scan a surface of a test lens with a linear luminous flux;
   a Hartmann plate provided on a side opposite to the scanning optical system with respect to the test lens and having a plurality of two-dimensionally arranged pinholes, the Hartmann plate being configured to transmit the linear luminous flux which has passed through the test lens and radiated on the pinholes by the scanning performed by the scanning optical system;
   a screen on which the linear luminous flux having passed through the Hartmann plate is projected; and
   a photographing optical system including a camera provided on a side opposite to the Hartmann plate with respect to the screen and configured to photograph the screen while the scanning with the linear luminous flux is being performed by the scanning optical system.

2. The lens characteristic evaluation device according to claim 1, further comprising:
   processing circuitry configured to perform as
      a position acquisition unit configured to analyze a captured image of the screen that is photographed by the photographing optical system and acquire a projection position of the linear luminous flux projected on the screen;
a position determination unit configured to determine a pinhole position of the pinhole through which the linear luminous flux projected on the screen has passed; and
an optical characteristic acquisition unit configured to acquire an optical characteristic of the test lens, based on the projection position acquired by the position acquisition unit, a determination result of the pinhole position by the position determination unit, and known positional relationship among the test lens, the Hartmann plate, and the screen.

3. The lens characteristic evaluation device according to claim 2, wherein the position determination unit determines the pinhole position based on the projection position of the linear luminous flux acquired by the position acquisition unit and a scan angle of the linear luminous flux in the scanning by the scanning optical system, the scan angle being an angle of the linear luminous flux projected at the projection position.

4. The lens characteristic evaluation device according to claim 3, further comprising:
a half mirror provided at a location on an optical path of the linear luminous flux extending from the scanning optical system to the surface of the test lens, and configured to split the linear luminous flux;
a light-receiving optical system including a lens and a sensor configured to receive the linear luminous flux split by the half mirror; and
the processing circuitry is further configured to perform as a measured value acquisition unit configured to acquire a measured value of the scan angle based on a light receiving position of the linear luminous flux received by the light-receiving optical system, wherein
the position determination unit determines the pinhole position based on the projection position of the linear luminous flux and the measured value of the scan angle acquired by the measured value acquisition unit.

5. The lens characteristic evaluation device according to claim 4, wherein the processing circuitry is further configured to perform as a mapping image generation unit configured to generate a mapping image indicating a distribution of the optical characteristic of the test lens, based on the optical characteristic of the test lens acquired by the optical characteristic acquisition unit and the measured value of the scan angle acquired by the measured value acquisition unit.

6. The lens characteristic evaluation device according to claim 1, wherein
the pinholes are two-dimensionally arranged at regular intervals in the Hartmann plate, and
the scanning optical system adjusts a diameter of the linear luminous flux so as to be larger than a diameter of the pinholes on the Hartmann plate and smaller than a distance between the pinholes adjacent to each other.

7. The lens characteristic evaluation device according to claim 1, further comprising processing circuitry configured to perform as a point image number adjustment unit configured to control the scanning optical system so as to adjust a number of point images which are formed by the linear luminous flux and included in the captured image of the screen photographed by the photographing optical system.

8. The lens characteristic evaluation device according to claim 1, further comprising processing circuitry configured to perform as a scan setting unit configured to perform setting of at least either one of a scanning range and a type of a scanning pattern of the linear luminous flux, wherein
the scanning optical system performs scanning with the linear luminous flux in accordance with the setting by the scan setting unit.

9. The lens characteristic evaluation device according to claim 1, further comprising:
processing circuitry configured to perform as an optical system control unit configured to control a scan angle of the linear luminous flux emitted from the scanning optical system so as to scan the surface of the test lens with the linear luminous flux;
a half mirror provided at a location on an optical path of the linear luminous flux extending from the scanning optical system to the surface of the test lens, and configured to split the linear luminous flux;
a light-receiving optical system including a lens and a sensor configured to receive the linear luminous flux split by the half mirror;
the processing circuitry further configured to perform as a measured value acquisition unit configured to acquire a measured value of the scan angle based on a light receiving position of the linear luminous flux received by the light-receiving optical system; and
the processing circuitry further configured to perform as a correction unit configured to correct control of the scan angle by the optical system control unit based on a result of comparison between an instruction value of the scan angle acquired in advance and the measured value acquired by the measured value acquisition unit.

10. A method of operating a lens characteristic evaluation device, the device including a Hartmann plate provided on one surface side of a test lens and having a plurality of two-dimensionally arranged pinholes, a screen provided on a side opposite to the test lens with respect to the Hartmann plate, and a photographing optical system provided on a side opposite to the Hartmann plate with respect to the screen and configured to perform photographing of the screen, the method comprising:
a step of scanning a surface of the test lens with a linear luminous flux by a scanning optical system arranged on another surface side opposite to the one surface side of the test lens; and
a step of photographing, by the photographing optical system, the screen on which the linear luminous flux having passed through the test lens and the pinhole is projected while the scanning with the linear luminous flux is being performed by the scanning optical system.

11. The method of operating the lens characteristic evaluation device according to claim 10, further comprising:
a position acquisition step of analyzing a captured image of the screen photographed by the photographing optical system and acquiring a projection position of the linear luminous flux projected on the screen;
a position determination step of determining a pinhole position of the pinhole through which the linear luminous flux projected on the screen has passed; and
an optical characteristic acquisition step of acquiring an optical characteristic of the test lens based on the projection position acquired in the position acquisition step, a determination result of the pinhole position in the position determination step, and known positional relationships among the test lens, the Hartmann plate, and the screen, wherein
the position determination step determines the pinhole position based on the projection position of the linear luminous flux acquired in the position acquisition step and a scan angle of the linear luminous flux in the scanning by the scanning optical system, the scan angle being an angle of the linear luminous flux projected at the projection position, the position determination step includes a light splitting step of splitting linear luminous flux at a location on an optical path of the linear luminous flux extending from the scanning optical system to the surface of the test lens, a light receiving step of receiving the linear luminous flux split in the light splitting step by a light-receiving optical system, and a measured value acquisition step of acquiring a measured value of the scan angle based on a light receiving position of the linear luminous flux received by the light-receiving optical system, and the position determination step determines the pinhole position based on the projection position of the linear luminous flux and the measured value of the scan angle acquired in the measured value acquisition step.

12. The method of operating the lens characteristic evaluation device according to claim 10, wherein the lens characteristic evaluation device includes processing circuitry configured to perform as an optical system control unit configured to control a scan angle of the linear luminous flux emitted from the scanning optical system so as to scan the surface of the test lens with the linear luminous flux, and the method further comprises:

a light splitting step of splitting the linear luminous flux at a location on an optical path of the linear luminous flux extending from the scanning optical system to the surface of the test lens;

a light receiving step of receiving the linear luminous flux split in the light splitting step;

a measured value acquisition step of acquiring a measured value of the scan angle based on a light receiving position of the linear luminous flux received in the light receiving step; and a correction step of correcting control of the scan angle by the optical system control unit based on a result of comparison between an instruction value of the scan angle acquired in advance and the measured value acquired in the measured value acquisition step.

* * * * *